United States Patent
Shaarawi et al.

(10) Patent No.: US 12,023,738 B2
(45) Date of Patent: Jul. 2, 2024

(54) CREATING A BREAKAWAY REGION

(71) Applicant: HEWLETT-PACKARD DEVELOPMENT COMPANY, L.P., Spring, TX (US)

(72) Inventors: Mohammed S. Shaarawi, Corvallis, OR (US); James McKinnell, Corvallis, OR (US); David A. Champion, Corvallis, OR (US); Vladek P. Kasperchik, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 80 days.

(21) Appl. No.: 17/866,435

(22) Filed: Jul. 15, 2022

(65) Prior Publication Data
US 2023/0033873 A1    Feb. 2, 2023

Related U.S. Application Data

(60) Division of application No. 16/605,247, filed as application No. PCT/US2018/032020 on May 10, (Continued)

(51) Int. Cl.
*B33Y 30/00* (2015.01)
*B22F 1/05* (2022.01)
(Continued)

(52) U.S. Cl.
CPC ............... *B22F 5/003* (2013.01); *B22F 1/05* (2022.01); *B22F 3/1021* (2013.01); *B22F 10/00* (2021.01); *B22F 10/14* (2021.01); *B22F 10/32* (2021.01); *B22F 10/43* (2021.01); *B22F 10/47* (2021.01); *B22F 10/64* (2021.01); *B22F 10/68* (2021.01);
(Continued)

(58) Field of Classification Search
CPC ......... B33Y 10/00; B33Y 30/00; B22F 10/14; B22F 10/64; B22F 12/53; B22F 12/52; B22F 12/55
See application file for complete search history.

(56) References Cited

U.S. PATENT DOCUMENTS

| | | | |
|---|---|---|---|
| 5,503,785 A | 4/1996 | Crump et al. | |
| 6,609,043 B1 | 8/2003 | Zoia et al. | |

(Continued)

FOREIGN PATENT DOCUMENTS

| | | | |
|---|---|---|---|
| CN | 101898423 A | 12/2010 | |
| CN | 106414804 A | 2/2017 | |

(Continued)

OTHER PUBLICATIONS

Chen Yong, Preparation and Characterization of Porous Materials, Jan. 31, 2010, p. 221, University of Science and Technology of China Press.
(Continued)

*Primary Examiner* — Michael P Wieczorek
(74) *Attorney, Agent, or Firm* — Dierker & Kavanaugh, P.C.

(57) ABSTRACT

An apparatus is disclosed to create a breakaway junction for 3D printed parts. Powder is spread along a target zone, such as a build bed. A liquid functional agent is selectively dispensed upon the powder to form a 3D object, a supporting part, and the breakaway junction between them.

8 Claims, 16 Drawing Sheets

Related U.S. Application Data 2018, now Pat. No. 11,433,457, which is a continuation-in-part of application No. PCT/US2018/022699, filed on Mar. 15, 2018, which is a continuation-in-part of application No. PCT/US2018/020169, filed on Feb. 28, 2018.

(51) Int. Cl.

| | | |
|---|---|---|
| *B22F 3/10* | (2006.01) | |
| *B22F 5/00* | (2006.01) | |
| *B22F 10/00* | (2021.01) | |
| *B22F 10/14* | (2021.01) | |
| *B22F 10/32* | (2021.01) | |
| *B22F 10/43* | (2021.01) | |
| *B22F 10/47* | (2021.01) | |
| *B22F 10/64* | (2021.01) | |
| *B22F 10/68* | (2021.01) | |
| *B22F 10/85* | (2021.01) | |
| *B29C 64/165* | (2017.01) | |
| *B29C 64/393* | (2017.01) | |
| *B33Y 10/00* | (2015.01) | |
| *B33Y 40/00* | (2020.01) | |
| *B33Y 40/20* | (2020.01) | |
| *B33Y 50/02* | (2015.01) | |
| *B33Y 70/00* | (2020.01) | |
| *B33Y 70/10* | (2020.01) | |
| *B33Y 80/00* | (2015.01) | |
| *C09D 11/033* | (2014.01) | |
| *C09D 11/38* | (2014.01) | |
| *B29K 505/00* | (2006.01) | |

(52) U.S. Cl.
CPC ............ *B22F 10/85* (2021.01); *B29C 64/165* (2017.08); *B29C 64/393* (2017.08); *B33Y 10/00* (2014.12); *B33Y 30/00* (2014.12); *B33Y 40/00* (2014.12); *B33Y 40/20* (2020.01); *B33Y 50/02* (2014.12); *B33Y 70/00* (2014.12); *B33Y 70/10* (2020.01); *B33Y 80/00* (2014.12); *C09D 11/033* (2013.01); *C09D 11/38* (2013.01); *B22F 2201/013* (2013.01); *B22F 2302/10* (2013.01); *B22F 2302/45* (2013.01); *B22F 2998/10* (2013.01); *B22F 2999/00* (2013.01); *B29K 2505/00* (2013.01)

(56) References Cited

U.S. PATENT DOCUMENTS

| | | | |
|---|---|---|---|
| 7,291,242 B2* | 11/2007 | Khoshnevis | B33Y 10/00 |
| | | | 156/308.2 |
| 9,144,940 B2 | 9/2015 | Martin | |
| 9,168,328 B2 | 10/2015 | Sun et al. | |
| 9,592,539 B2 | 3/2017 | Dunn et al. | |
| 9,630,249 B2 | 4/2017 | Toyserkani et al. | |
| 9,744,720 B2 | 8/2017 | Napadensky | |
| 9,815,118 B1 | 11/2017 | Schmitt et al. | |
| 2005/0074596 A1 | 4/2005 | Nielsen et al. | |
| 2008/0090719 A1 | 4/2008 | Wada et al. | |
| 2008/0241404 A1 | 10/2008 | Allaman et al. | |
| 2015/0093283 A1 | 4/2015 | Miller et al. | |
| 2015/0273582 A1 | 10/2015 | Crump et al. | |
| 2015/0321289 A1 | 11/2015 | Bruck et al. | |
| 2016/0023373 A1 | 1/2016 | Demuth et al. | |
| 2016/0122541 A1 | 5/2016 | Jaker et al. | |
| 2016/0168453 A1 | 6/2016 | Florio et al. | |
| 2016/0207112 A1 | 7/2016 | Pallari | |
| 2016/0214176 A1 | 7/2016 | Bruck et al. | |
| 2016/0222791 A1 | 8/2016 | Rogers | |
| 2016/0229128 A1 | 8/2016 | Dayagi et al. | |
| 2016/0250808 A1 | 9/2016 | Barnwell et al. | |
| 2017/0057014 A1 | 3/2017 | Illston et al. | |
| 2017/0066197 A1 | 3/2017 | Morikawa et al. | |
| 2017/0173877 A1 | 6/2017 | Myerberg et al. | |
| 2017/0225227 A1 | 8/2017 | Volk | |
| 2017/0232671 A1 | 8/2017 | Fieldman | |
| 2017/0246807 A1 | 8/2017 | Emamjomeh et al. | |
| 2017/0247552 A1 | 8/2017 | Prasad et al. | |
| 2017/0252819 A1 | 9/2017 | Gibson et al. | |
| 2017/0253751 A1 | 9/2017 | Busbee et al. | |
| 2017/0266882 A1 | 9/2017 | Yan et al. | |
| 2017/0297099 A1 | 10/2017 | Gibson et al. | |
| 2017/0297103 A1* | 10/2017 | Myerberg | B22F 7/02 |
| 2017/0297106 A1 | 10/2017 | Myerberg et al. | |
| 2017/0297108 A1 | 10/2017 | Gibson et al. | |
| 2017/0312824 A1 | 11/2017 | Harrysson | |
| 2017/0361600 A1 | 12/2017 | Bandyopadhyay et al. | |
| 2021/0001401 A1 | 1/2021 | Shaarawi et al. | |

FOREIGN PATENT DOCUMENTS

| | | |
|---|---|---|
| CN | 106515000 A | 3/2017 |
| CN | 106735224 A | 5/2017 |
| CN | 107116218 A | 9/2017 |
| EP | 3278908 A1 | 2/2018 |
| RU | 2015148439 A | 5/2017 |
| RU | 2629072 C2 | 8/2017 |
| WO | 2014/092205 A1 | 6/2014 |
| WO | 2015/175167 A1 | 11/2015 |
| WO | 2016/068899 A1 | 5/2016 |
| WO | 2017/014785 A1 | 1/2017 |
| WO | 2017/180314 A1 | 10/2017 |
| WO | 2017/181054 A1 | 10/2017 |
| WO | 2017/184136 A1 | 10/2017 |
| WO | 2018/017130 A1 | 1/2018 |
| WO | 2018/022034 A1 | 2/2018 |

OTHER PUBLICATIONS

Halinen, Juho, 3D Printing—Increasing Competitiveness in Technical Maintenance, Apr. 1, 2017, Aaltodoc, 71 pages.

Li Jingyuan, Special Metal Materials and Processing Technology Thereof, May 31, 2010, p. 225, Metallurgical Industry Press.

Supports in 3d Printing: A Technology Overview, 2016, online available at <https://www.3dhubs.com/knowledge-base/supports-3d-printing-technology-overview>, 15 pages.

* cited by examiner

100

CREATING A BREAKAWAY REGION

CROSS-REFERENCE TO RELATED APPLICATIONS

This application is a divisional of U.S. Ser. No. 16/605,247, filed Oct. 15, 2019, which itself is a 371 National Stage filing of PCT/US2018/032020, filed May 10, 2018, which itself is a continuation-in-part of PCT/US2018/022699, filed Mar. 15, 2018, which itself is a continuation-in-part of PCT/US2018/020169, filed Feb. 28, 2018, the contents of each of which is incorporated by reference herein in its entirety.

BACKGROUND

Three-dimensional (3D) print technology is a type of additive manufacturing in which successive layers of a build material are deposited, generally with the aid of a computing device. 3D binder jetting printers are a type of 3D printer in which a binder agent is deposited to bind, or hold, particles of a build material together, resulting in the 3D object. The binder agent is printed, or deposited, as droplets or as a stream in a liquid vehicle, in a desired pattern, using a suitable type of liquid jetting technology. The binder agent defines the geometry of the part that is being printed by binding portions of a layer of build material, such as powdered build material particles.

3D binder jetting printers may be used with metal build materials, such as metal powders, to produce bound "green" parts. Green parts may be removed from the printer and be processed in a sintering furnace to fuse or sinter the metal powder to produce a generally highly dense metal part.

Some green parts may involve physical support during the fusing or sintering phase, for example to prevent sagging or deformation.

BRIEF DESCRIPTION OF THE DRAWINGS

The foregoing aspects of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with examples described herein, a method and apparatus are disclosed to create a breakaway junction for 3D printed parts, such as metal parts, using intermetallic or metal carbide compounds. The junction is disposed between support structures that are created along with the green part, enabling the support structure to be easily separated from the part following a sintering phase. To create the breakaway junction, a material in a breakaway liquid functional agent (LFA) is deposited to chemically react in a region around the breakaway junction, for example, during the sintering process. This creates a breakaway junction or region comprising the powder used to form the 3D part and the material in the breakaway LFA. Where the breakaway junction is an intermetallic or metal carbide, the junction comprises a compound that is brittle and thermodynamically stable, with the intermetallic or metal carbide compounds being localized to the breakaway junction. The resulting stability allows the breakaway region material to remain after sintering, and the brittleness facilitates easy separation of the support structure from the 3D part being generated.

As used herein, a binding LFA or binding agent refers to a patterning fluid that includes a binder, but that does not include the compound that will react to form the breakaway, or intermetallic, regions. In contrast, a breakaway LFA includes compounds that will react during sintering to form breakaway regions that include intermetallic compounds, among others. Examples of the two types of binding agents are described further herein.

Figure 1:
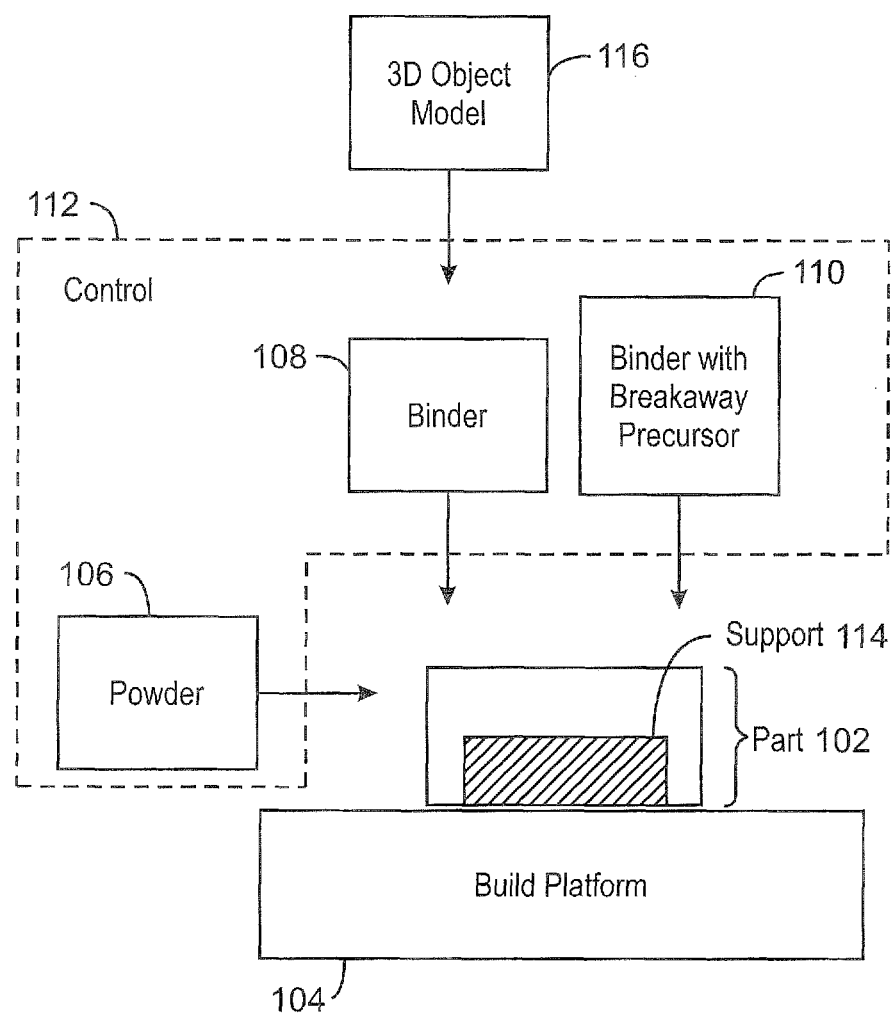
FIG. 1 is a simplified block diagram showing elements of a 3D binder jet printer capable of creating a breakaway region in a 3D object, according to some examples.
Figure 15:
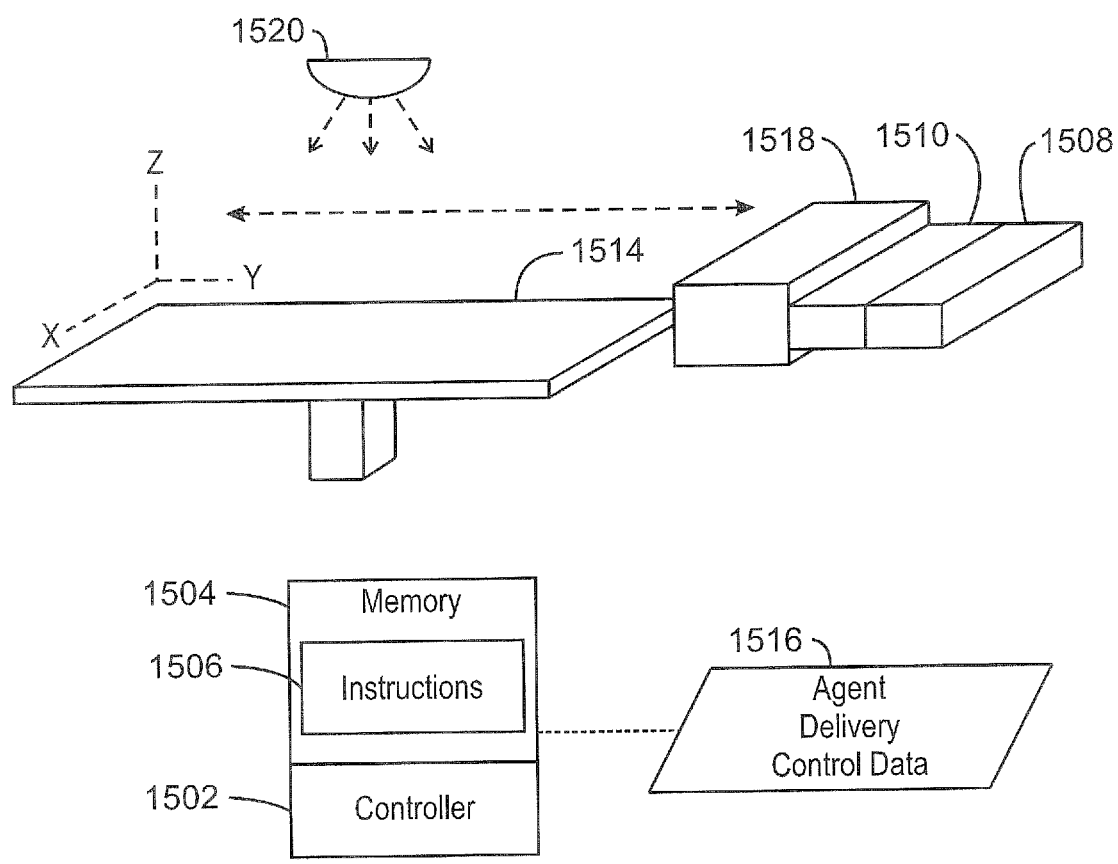
FIG. 15 is a schematic diagram of a 3D printer capable of creating a breakaway junction in a 3D part, according to some examples.

FIG. 1 is a simplified block diagram showing elements of a 3D binder jet printer 100 capable of creating a breakaway region in a 3D object 102, according to some examples. A more detailed depiction of a 3D printer capable of performing the operations described herein is illustrated in FIG. 15. The 3D binder jet printer 100 dispenses printing agents and build material into a target zone 104, also known as a build platform. The materials are selectively dispensed, or deposited, by a control mechanism 112, based upon a 3D object model 116 or other input. The control mechanism 112 may comprise a processor-based system executing a program loaded into a memory, which uses the 3D object model 116 to control how the powder 106, binder 108, and binder with breakaway precursor 110 are dispensed upon the build platform 104. The control 112 may be implemented using hardware or firmware, or a combination of hardware, software, and firmware. The breakaway precursor may be evaporated from the build bed until the junction comprises a desired concentration of precursor.

Powder 106 is dispensed upon the build platform 104, such as by using a powder formation mechanism, such as a spreader. The powder 106 may be, for example, a powdered semi-crystalline material, a powdered metal material, a powdered composite material, a powdered ceramic material, among other types of powdered material. A delivery system, such as a print head, dispenses a binder agent 108, a binder agent with a breakaway precursor 110, or both, upon the powder located on the build platform. The powder spreader and delivery systems are described in more detail in FIG. 15. The end product of the 3D binder jet printer 100 is a 3D object 102 along with a support structure 114, also known herein as "the part" or "the green part." As will be shown, the 3D binder jet printer 100 extends the state of the art by avoiding labor intensive processes, such as cutting, to separate the support structure(s) from the 3D part.

Figure 2:
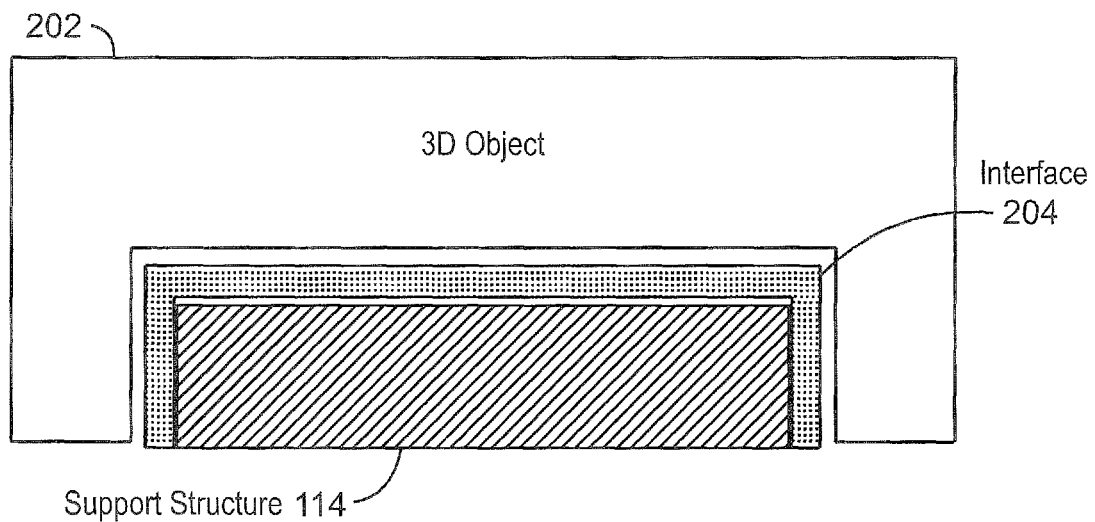
FIG. 2 is a simplified block diagram showing a 3D printed object and a support structure, according to some examples.

FIG. 2 is a more detailed block diagram of the part 102 of FIG. 1, according to some examples. The part 102 includes a 3D object 202 with the support structure 114, as well as an interface 204. As described herein, the 3D object 202, the interface 204, and the supporting structure 114 are formed by depositing, layer by layer, powder and binder, which may be termed a green part generation phase. The supporting structure 114, also known herein as a supporting part, may be useful at a later time, for example, during a sintering phase, because the sintering phase involves heat and the 3D object 202 may deform if no supporting is present. Because the part being generated may have a more complex shape than is indicated in FIG. 2, reference to the supporting part used herein may infer more than one structure, e.g., supporting part(s).

In some examples, the control mechanism 112 of the 3D binder jet printer 100 (FIG. 1), using the 3D object model 116, controls the generation of the part 102, including the 3D object 202, the support structure 114, and the interface 204. For example, the 3D object model 116 may be a computer-aided design image to generate printer control data that will control the generation of the support structure 114, the interface 204, and the 3D object 202. The data to cause generation of the support structures may also be added by the printer itself, for example, based on calculations within the printer.

FIGS. 3-11 are schematic diagrams showing the generation of a 3D part having a breakaway region, according to some examples. In FIGS. 3 through 11, the printing process performed by the 3D binder jet printer 100 of FIG. 1, from the first layer of powder through to a fully sintered part, with the supporting part(s) removed and ready for use. Each figure is associated with a stage of the process, with the stages being denoted as 300-1100.

Additionally, two phases of the printing process, the green part generation phase and the sintering phase, are indicated.

Figure 3:
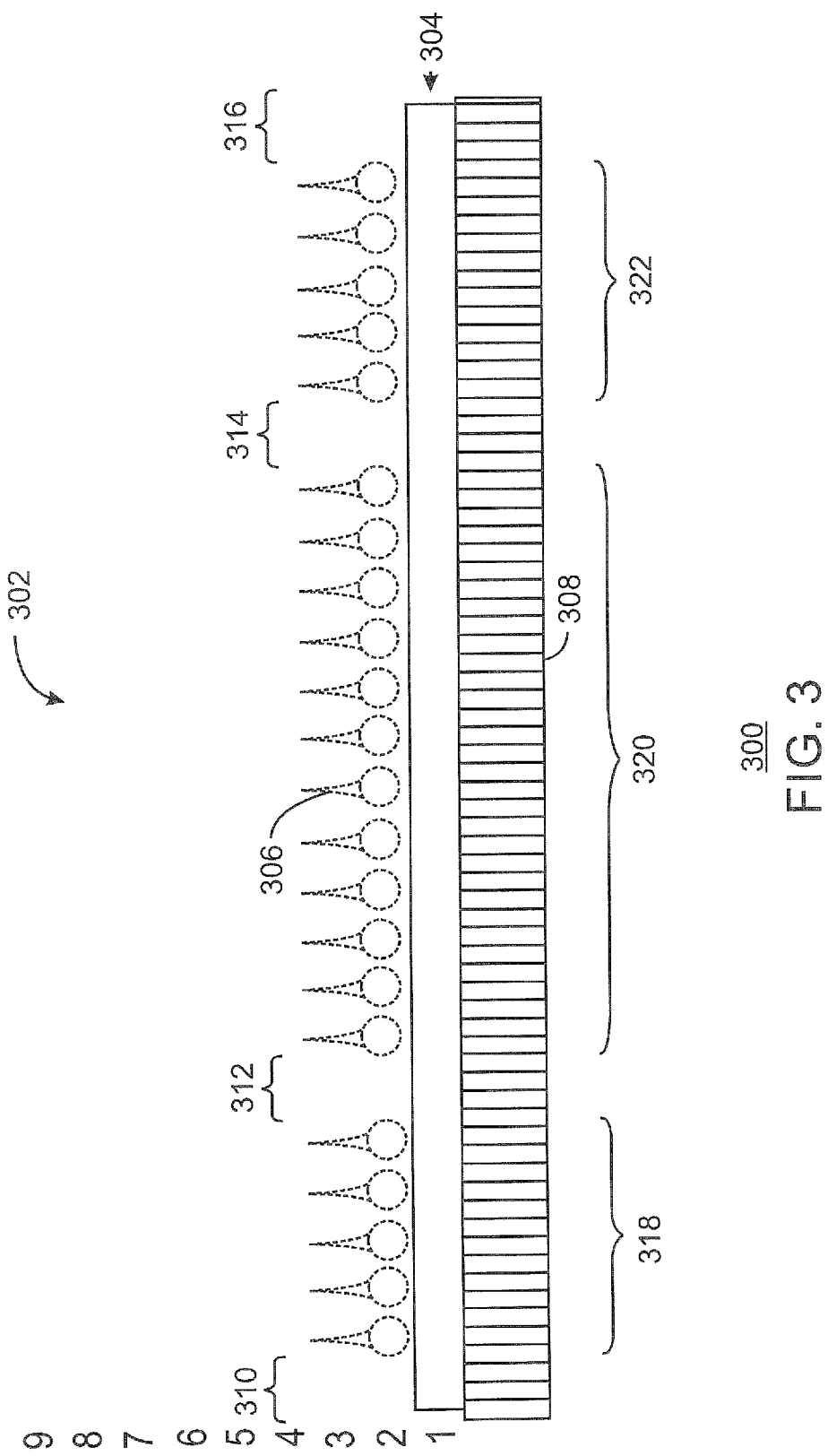
FIGS. 3-11 are schematic diagrams showing the generation of a 3D part having a breakaway region, according to some examples.

In FIG. 3, a stage 300, part of the green part generation phase of 3D part production, is depicted as a representative side view. A first layer (denoted "1") of powder or particles 304 that will form the part and supporting part(s) is deposited upon a substrate 308 of a target zone 302. Powder receiving binder droplets 306 are indicated as regions 318, 320, and 322 while powder not receiving binder droplets is indicated as regions 310, 312, 314, and 316. At the left of the view, numbers 1-9 are meant to denote each succeeding layer of powder 304 in the target zone 302.

The powder 304 is composed of a range of particle sizes, all below a certain desired size. The variety of particle sizes making up the powder 304 may also be referred to as a "mesh."

Droplets disposed above the powder 304 are inkjet droplets of a binder 306, also known as a binding LFA. A binder is a material that has at least the function of holding particles together so that a structure can be defined in the target zone, to later be removed from the bed for further processing, such as sintering. In one example, the binder is a latex ink-based material that binds the powder once thermally cured.

The binder 306 acts to bind the particles 304 directly, and this binding may take place in the target zone 302. The binder 306 may be thermally cured to bind to the particles, as one example. Alternatively, the binder 306 may evaporate to form a strong film, be thermally or ultraviolet cured, or undergo other treatments to bind particles. In some examples, the binder is a fluid composition containing solid binder material dispersed or dissolved in a carrier fluid. After digital application of the binder fluid via inkjet deposition, the carrier fluid is evaporated while the binder material remains binding powder particles into the green part. Separate drying and curing phases may be involved for each layer of material. Example binder formulations are described herein. As one example, the binder agent may be partially cured on a layer-by-layer basis.

The binding LFA 306 is deposited in a pattern, typically determined digitally. Across the row of powder 304, regions 318, 320, and 322 are receiving binding LFA 306 while regions 310, 312, 314, and 316 are not receiving binding LFA. Non-bound powder in regions 310, 312, 314, and 316 are to be removed as the part is taken from the target zone 302 (green part generation phase) for further processing in a sintering oven (sintering phase).

In FIG. 3, the powder 304 is resting on the substrate 308. The first print layer of powder 304 is not necessarily in contact with the substrate 308. During the green part generation phase, the substrate 308 and powder 304 surrounding the part to be formed acts as a support during its formation.

Figure 4:
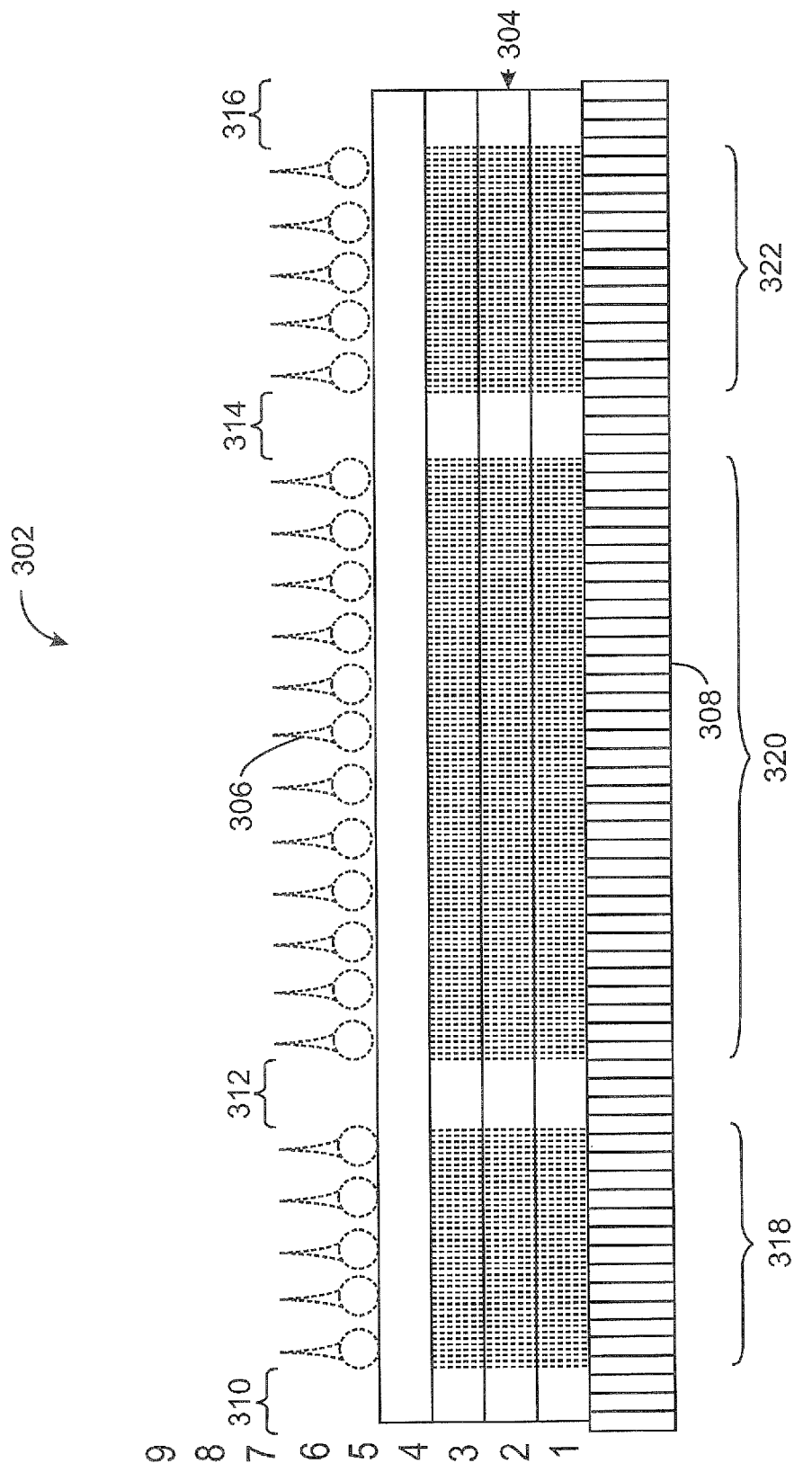

FIG. 4, a stage 400, still in the green part generation phase, depicts a representative side view featuring additional layers (numbered "2," "3," and "4") of powder 304 that will form the part and support structure in the target zone 302. Like numbered items are as described with respect to FIG. 3. A fourth layer of powder 304 has been deposited and a set of binder droplets 306 is digitally applied to pattern the fourth layer of the part and support structure. The three layers below have a structure defined by where the binder 306 has been deposited. This is signified schematically by the shading within each rectangle representing a layer of powder. Shaded regions 318 and 322 will form part of the object being generated.

As described with respect to FIGS. 1 and 2, the part 102 is made up of the 3D object 202, the support part 114, and the interface 114. Upon close examination of FIG. 4, the 3D object portion and support structure of the part are beginning to emerge, with powder 304 surrounded by binding LFA 306 forming in sections 318 and 322 (the 3D object) and with powder surrounded by binding LFA in sections 320 (the supporting structure). Thus, the 3D object and the supporting structure making up the part 102 are made from the same powder build material.

Figure 5:
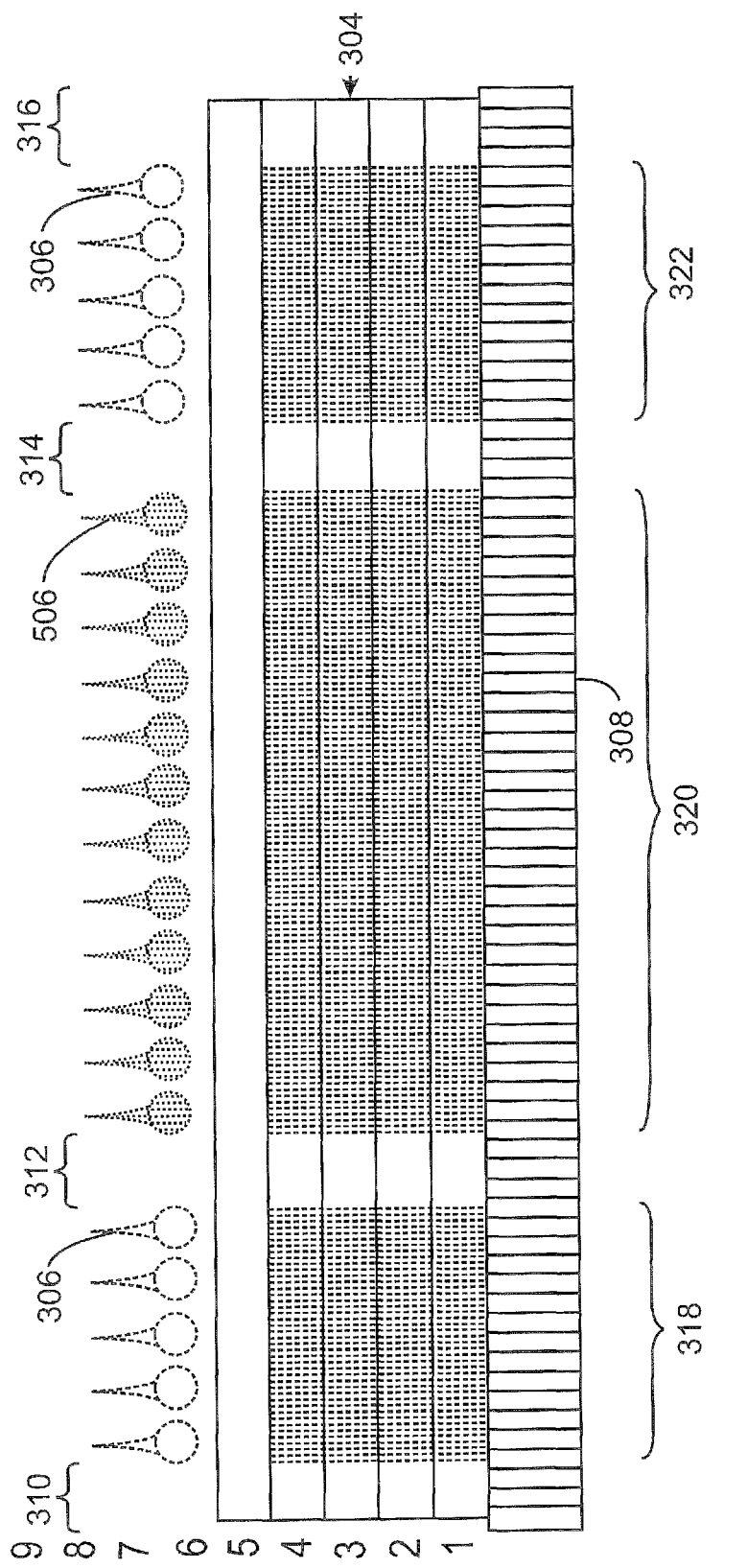

FIG. 5, a stage 500, also still in the green part generation phase, depicts a representative side view 500 featuring additional layers of powder 304 that will form the 3D object and supporting structure of the part in the target zone 302. Like numbered items are as described with respect to FIGS. 3 and 4. As before, the binder agent 306 is deposited over powder 304 in regions 318 and 322, while no binder agent is deposited in regions 310, 312, 314, and 316. A further printing agent, known herein as an interface agent 506, is deposited, represented by the shaded droplets above the region 320. In one example, the interface agent 506 includes the materials of the binding LFA 306, plus a precursor. The top layer of powder 304 (layer 5) above region 320 receives the breakaway LFA 506. Similar to the binder 306, the breakaway LFA 506 holds the powder 304 together in the target zone, enabling the formed part to later be removed to a sintering oven. The precursor that distinguishes the binding LFA 306 from the breakaway LFA 506 is described in more detail herein.

Figure 6:
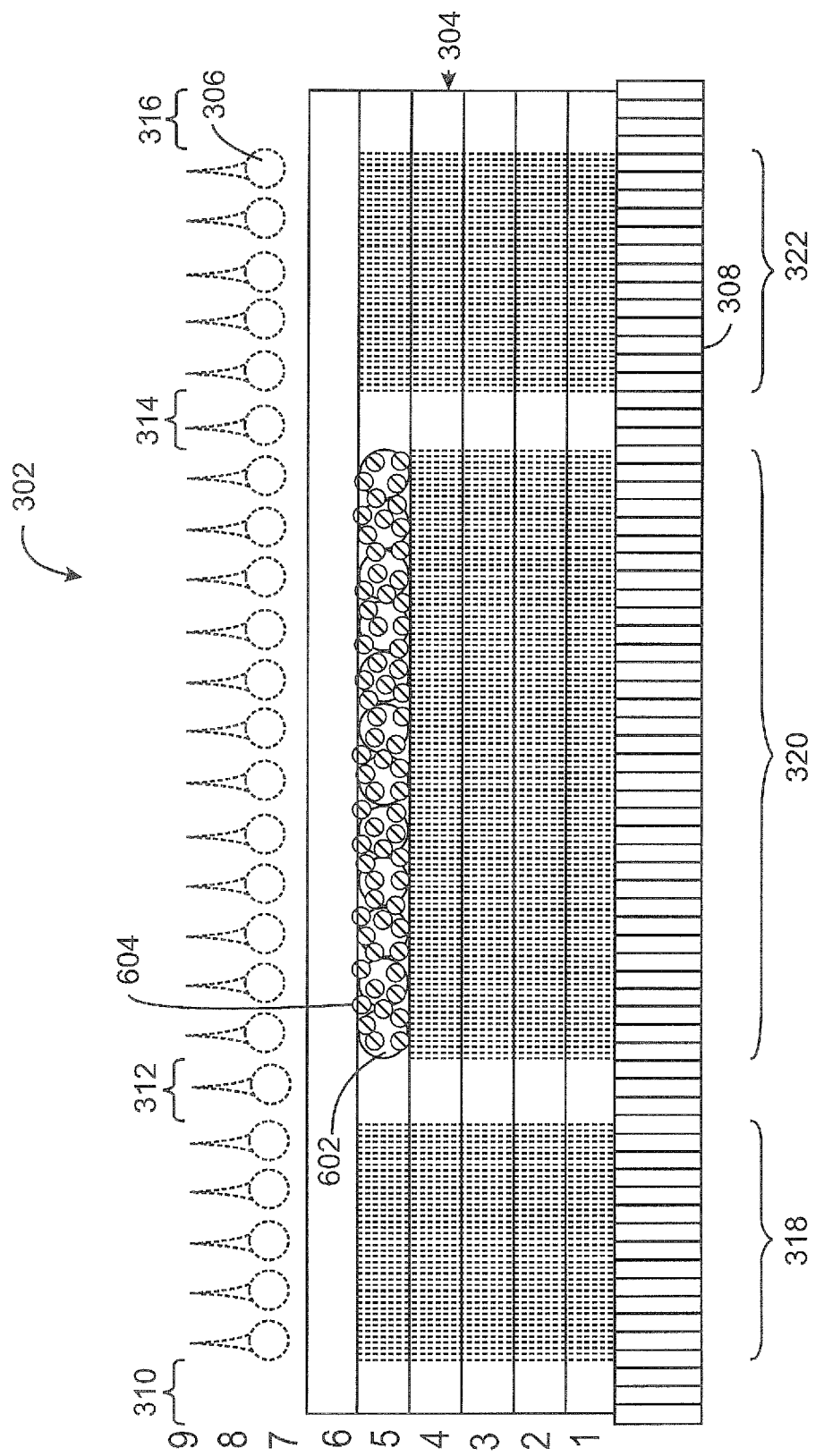

FIG. 6, stage 600 in the green part generation phase, depicts a representative side view of an additional layer of powder 304 in the target zone 302. Like numbered items are as described with respect to FIGS. 3, 4, and 5. A sixth layer of powder 304 has been placed on the target zone 302 and is being bound digitally using the binding LFA 306. In this example, the binding LFA 306 is being deposited into all powder 304 of the sixth row except at the ends.

As described herein, the breakaway LFA 506 (FIG. 5) includes a precursor that can react during sintering to form a breakaway region which is weaker than the surrounding sintered material. The breakaway region can include an intermetallic compound, a carbon compound, and the like. To represent this, in FIG. 6, a fine particle composite 602 is shown in the fifth layer, in the region 320. The fine particle composite 602 comprises the powder 304 bound with a precursor 604 from the breakaway LFA 506, and thus forms the junction between the 3D object and its supporting part. The fine particle composite 602 is represented by large circles, representing the powder 304, plus small randomly arrayed circles, representing the precursor 604.

The fine particle composite 602 in FIG. 6 features a single layer of powder 304. However, in some examples, the fine particle composite 602 that forms the junction between the 3D object and its supporting part(s) may comprise multiple layers of powder 304 and breakaway LFA 506. Thus, the illustration of FIG. 6 is simplified and the junction may comprise one or more layers formed in the green part generation phase.

Further, the fine particle composite 602 is depicted in FIG. 6 as a horizontally disposed portion between the 3D part and its supporting part. However, the fine particle composite 602 may also be disposed vertically between the 3D part and its supporting structure. Once moved to a sintering bed, the 3D part and supporting structure with vertically disposed fine particle composite 602 therebetween, may be rotated such that the fine particle composite is horizontally disposed. Designers of ordinary skill in the art will recognize a number of different arrangements possible in building the fine particle composite 602 between 3D part and its supporting structure(s).

Figure 7:
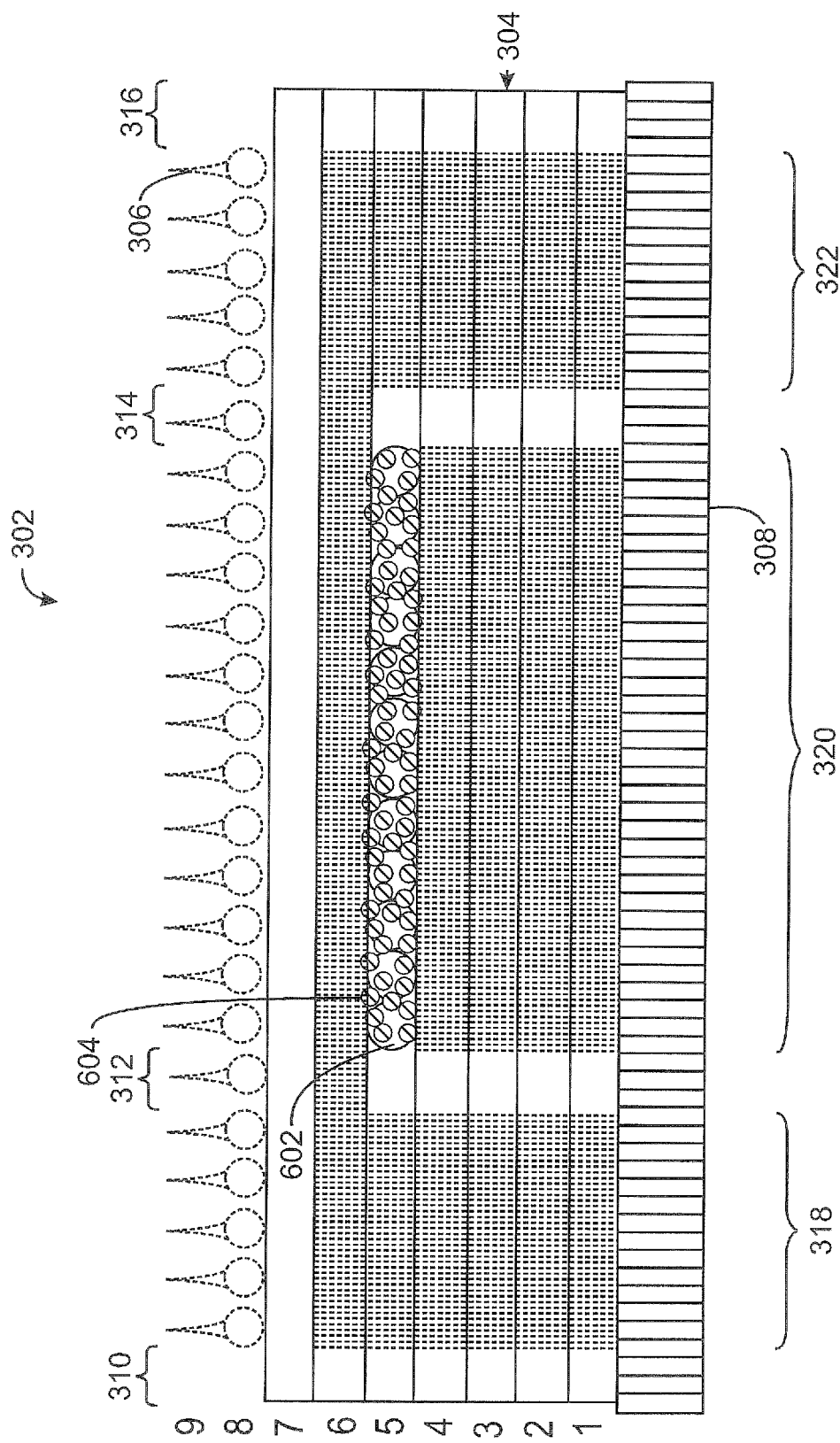

In FIG. 7, stage 700 of the green part generation phase, a seventh layer of powder 304 has been deposited in the target zone 302 and is being bound digitally using the binding LFA 306. Like numbered items are as described with respect to FIGS. 3-6. The binding LFA 306 is being deposited into powder 304 of the top layer (layer 7) except at regions 310 and 316, respectively. This is the same pattern as in FIG. 6, and thus the 3D object, support structure, and interface making up the part are being further completed.

Figure 8:
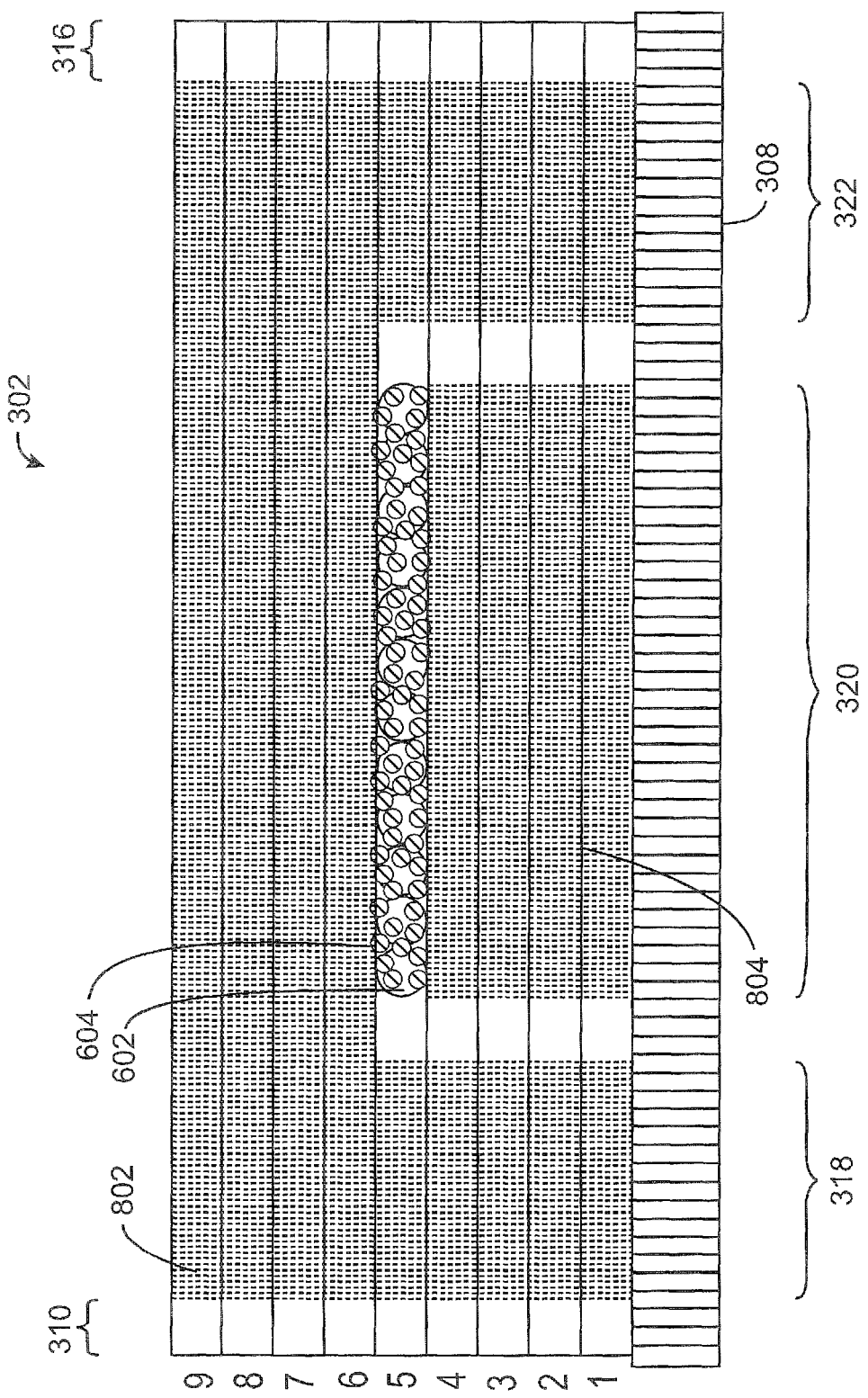

In FIG. 8, a fully formed 3D object 802 and supporting structure 804, both of which are outlined, are visible in the target zone 302 (green part generation phase). Like numbered items are as described with respect to FIGS. 3-7. During removal, powder 304 that has not received binding LFA 306 or breakaway LFA 506 (powder 304B) will remain in the target zone 302. The 3D object 802 and the supporting structure 804 will be removed as the "green part" after curing of the binder. This includes the fine particle composite 602 disposed between the 3D object 802 and the supporting structure 804.

When the green part, comprising the 3D object 802, the fine particle composite 602, and the supporting structure 804, is removed from the target zone 302, residual, unbound powder clinging to or in pockets surrounding the green part is generally removed. Removal methods can include, for example, pressurized air.

Figure 9:
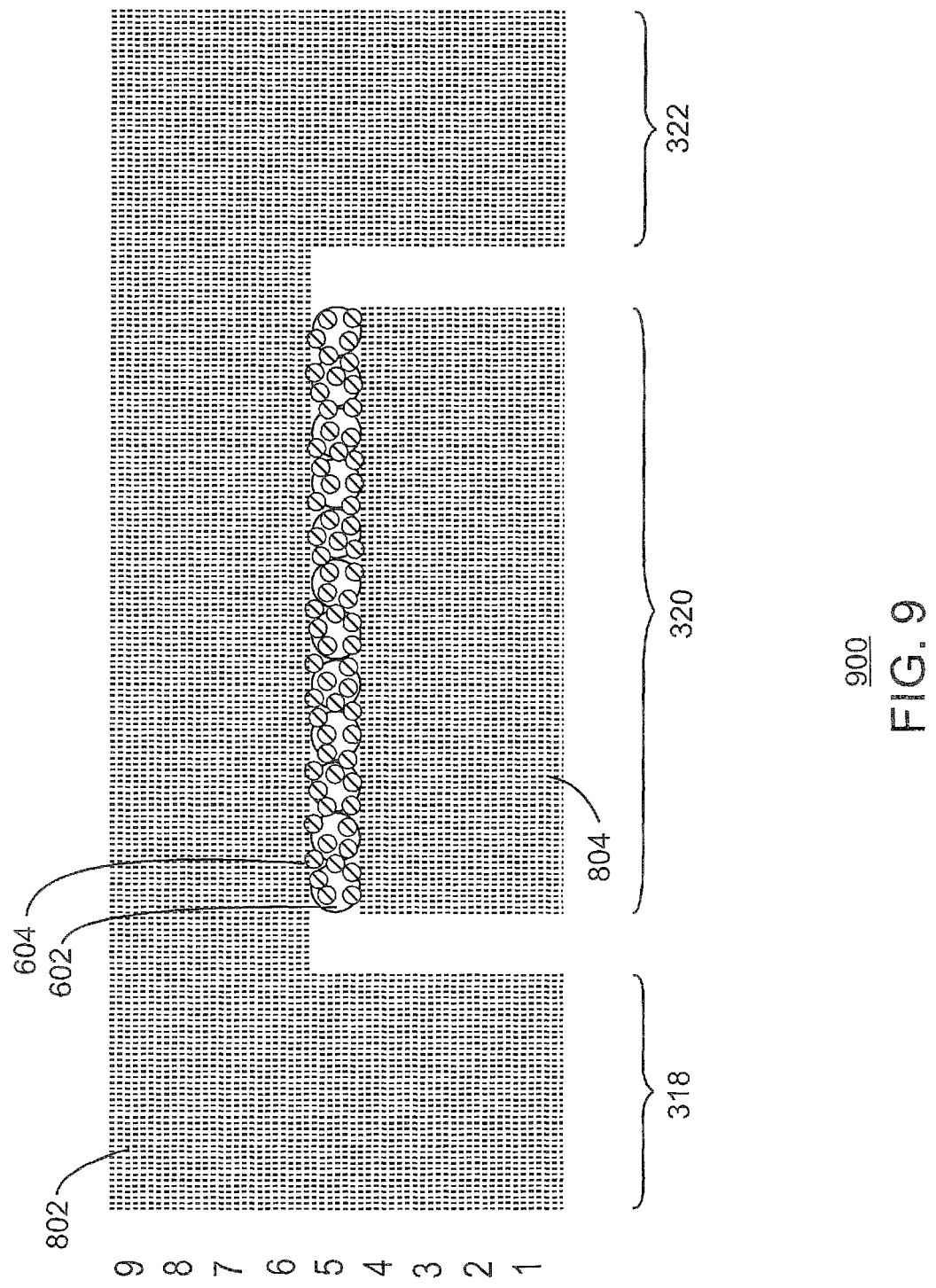

FIG. 9 shows a stage 900 which occurs between the green part generation phase (out of the target zone) but not yet in the sintering phase. The 3D object 802, the supporting structure 804, and the fine particle composite 602 disposed therebetween making up the part are shown, with no residual powder, after being removed from the target zone. Note the lack of a substrate, as the part is in transition between the target zone and the sintering oven.

Figure 10:
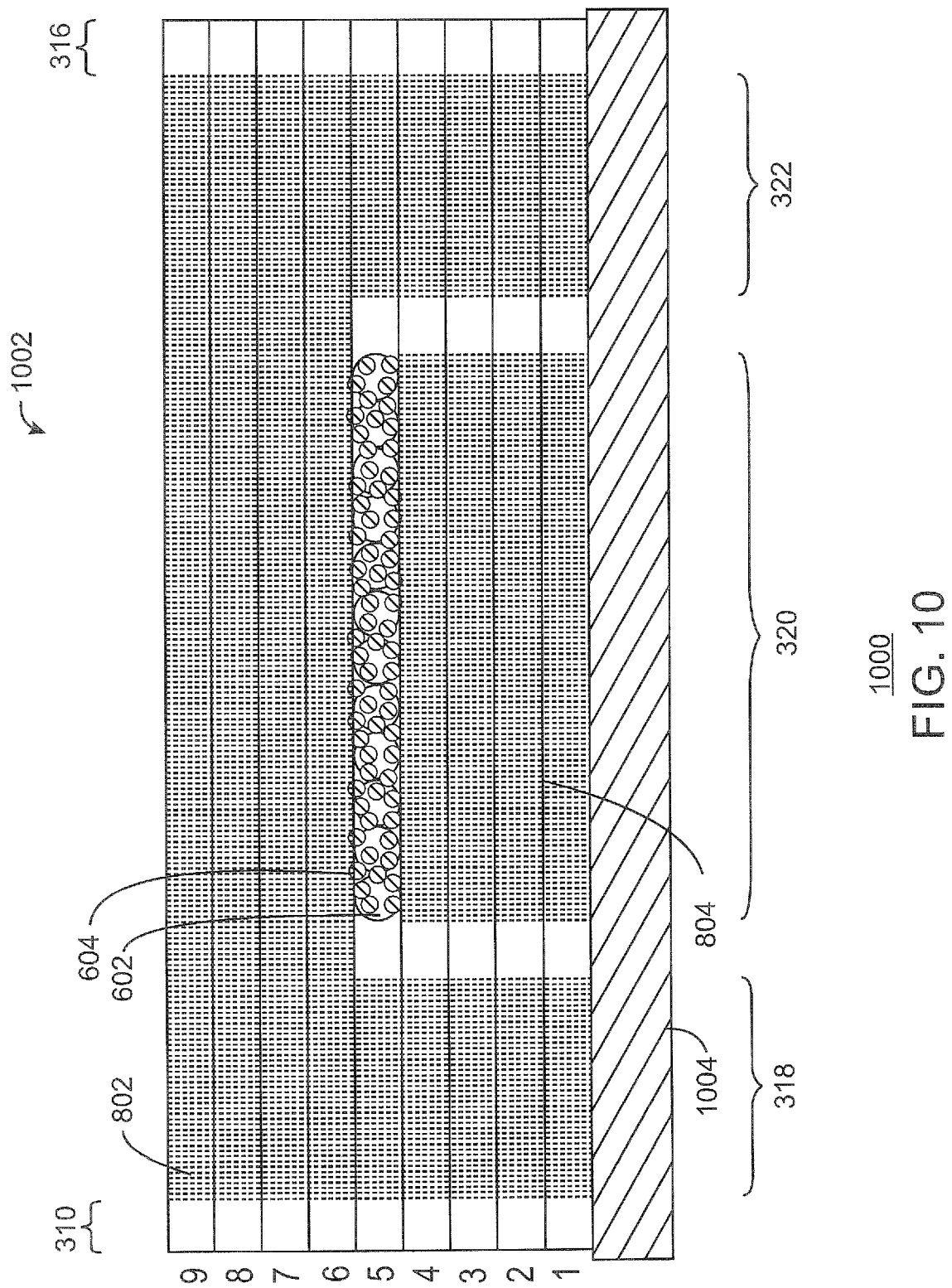

In FIG. 10, a stage 1000 is depicted (sintering phase), in which the part, made up of the 3D object 802, the supporting structure 804 and the interface 602, is placed in a sintering oven 1002 on an oven substrate 1004. In some examples, the thermal profile of the sintering oven 1002 is such that, during an initial stage of the thermal profile, the binder agents of the binding LFA 306 and the breakaway LFA 506 will substantially burn out. The binder agents may either vaporize or become otherwise removed during burn-out to such an extent that the structure of the final finished part is not negatively affected. During a later portion of the thermal profile, the part is taken to a temperature near, but below, the melting point of the metal or metal alloy powder particles, where the part densifies to a near 100% solidity. Specific examples of sintering operations are described in more detail herein.

Figure 11:
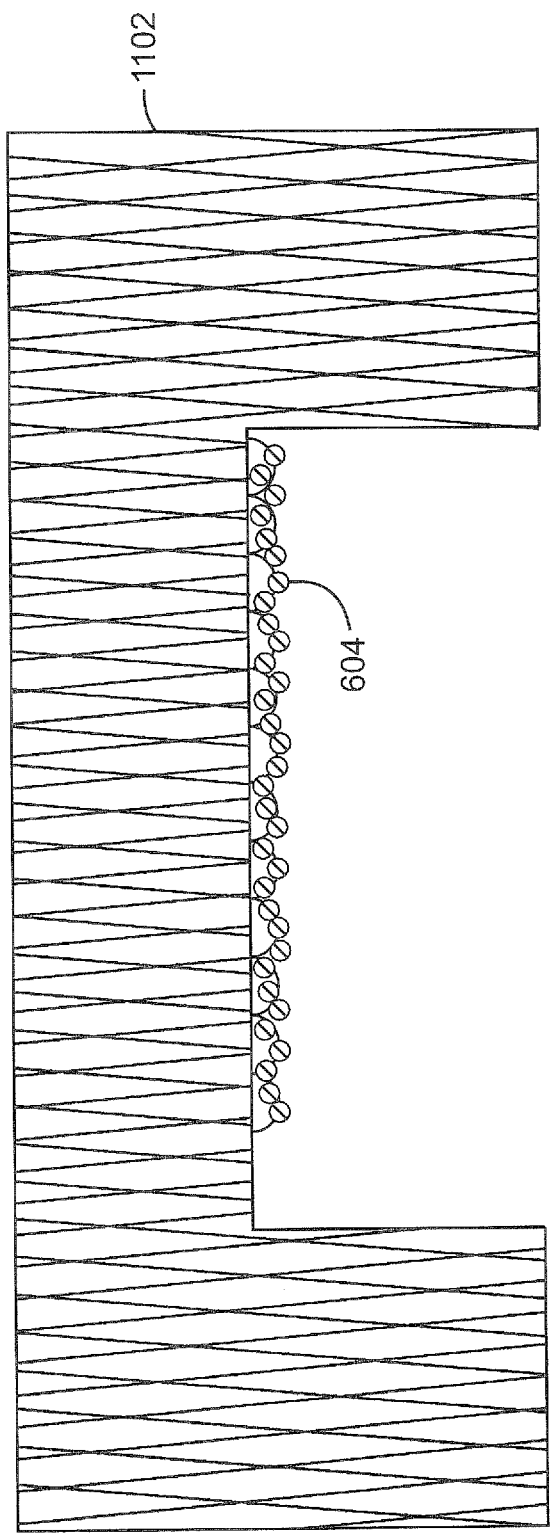

FIG. 11, in a stage 1100 which follows the sintering phase, the 3D object 802 (FIGS. 8-10), after sintering, becomes 3D object 1102. The 3D object 1102 is depicted after its support structure 804 (FIGS. 8-10) has been removed by hand or with minimal tool use. The precursor 604 portion of the fine particle composite 602 (FIGS. 6-9) is visible in FIG. 11 following separation of the supporting structure 804 from the 3D object. In some examples, the brittle breakaway region 604 breaks away along with the supporting structure 804, leaving the desired 3D object 1102 behind.

Powder

The powder (e.g., powder 304 in FIG. 3) may be a type of stainless steel powder having a predetermined range of sizes (e.g., a mesh). Table 1 gives two example stainless steel metal powders suitable for use by the 3D binder jet printer of FIG. 1 to generate the breakaway compound at the junction. The 316L stainless steel has Iron, Nickel, Chromium, Molybdenum, Carbon, Manganese, and Silicon in the concentrations shown, while the 430L stainless steel contains no Nickel and no Molybdenum.

TABLE 1

Metal powders

NOMINAL CHEMICAL COMPOSITION

| | Fe | Ni | Cr | Mo | C (max) | S | P | Mn (max) | Si (max) |
|---|---|---|---|---|---|---|---|---|---|
| 316L[1] | Bal. | 10-14 | 16-18 | 2-3 | 0.03 | 0.03 | 0.045 | 2 | 1 |
| 430L[2] | Bal. | — | 16-18 | — | 0.03 | 0.03 | 0.04 | 1 | 1 |

The powders in Table 1 may be obtained from
[1]Sandvik-Osprey
[2]AMTEK

As explained herein, the diameters of the powder are a distribution of sizes with a maximum size set using a mesh. In some examples, mesh sizes of—about 400 Mesh and −500 Mesh, both commercially available, are used, and result in about 37 micrometer (μm) and about 51 μm particle maximum diameters, respectively. In some examples, the size of the powder averages between about 12 and about 16 μm. In other examples, the powder averages smaller than about 12 μm.

In examples, the same build material may be used for generating the 3D part and the support structure. As described herein, the build material may include metal build material. In an example, the build material particles are a single phase metallic material composed of one element, with the sintering temperature being below the melting point of the single element. In another example, the build material particles are composed of two or more elements, which may be in the form of a single phase metallic alloy or a multiple phase metallic alloy, with sintering generally occurring over a range of temperatures.

The build material particles may be composed of a single element or alloys. Some examples of the metallic build material particles include steels, stainless steel, bronzes, titanium (Ti) and alloys thereof, aluminum (Al) and alloys thereof, nickel (Ni) and alloys thereof, cobalt (Co) and alloys thereof, iron (Fe) and alloys thereof, nickel cobalt (NiCo) alloys, gold (Au) and alloys thereof, silver (Ag) and alloys thereof, platinum (Pt) and alloys thereof, and copper (Cu) and alloys thereof. Specific examples include AlSi10Mg, 2xxx series aluminum, 4xxx series aluminum, CoCr MP1, CoCr SP2, MaragingSteel MS1, Hastelloy C, Hastelloy X, NickelAlloy HX, Inconel IN625, Inconel IN718, SS GP1, SS 17-4PH, SS 316L, SS 430L, Ti6Al4V, and Ti-6Al-4V EL17. While several example alloys have been provided, it is to be understood that other alloys may be used.

In some examples, the metallic build material particles may have a melting point ranging from about 500° C. to about 3500° C. In other examples, the metallic build material particles may be an alloy having a range of melting points.

The build material particles may be similarly sized particles or differently sized particles. The individual particle size of each of the build material particles is up to 100 µm. In an example, the build material particles may be particles, having a particle size ranging from about 1 µm to less than 100 µm. In another example, the individual particle size of the build material particles ranges from about 1 µm to about 30 µm. In still another example, the individual particle size of the build material particles ranges from about 2 µm to about 50 µm. In yet another example, the individual particle size of the build material particles ranges from about 5 µm to about 15 µm. In yet another example, the individual particle size of the build material particles ranges from about 3.25 µm to about 5 µm. In yet another example, the individual particle size of the build material particles is about 10 µm. As used herein, the term "individual particle size" refers to the particle size of each individual build material particle. As such, when the build material particles have an individual particle size ranging from about 1 µm to about 100 µm, the particle size of each individual build material particle is within the disclosed range, although individual build material particles may have particle sizes that are different than the particle size of other individual build material particles. In other words, the particle size distribution may be within the given range. The particle size of the build material particles generally refers to the diameter or volume weighted mean/average diameter of the build material particle, which may vary, depending upon the morphology of the particle. The build material particles may also be non-spherical, spherical, random shapes, or combinations thereof.

Liquid Functional Agent

Both type of LFA used herein, breakaway and binding, may include many of the same components as binders and adjutants. Examples of suitable binders include latexes (i.e., an aqueous dispersion of polymer particles), polyvinyl alcohol, polyvinylpyrrolidone, and combinations thereof.

Examples of polyvinyl alcohol include low weight average molecular weight polyvinyl alcohols (e.g., from about 13,000 to about 50,000), such as SELVOL™ PVOH 17 from Sekisui. Examples of polyvinylpyrrolidones include low weight average molecular weight polyvinylpyrrolidones (e.g., from about 15,000 to about 19,000), such as LUVITEC™ K 17 from BASF Corp.

The polymer particles of the latex may have several different morphologies. For example, the polymer particles may be individual spherical particles containing polymer compositions of hydrophilic (hard) component(s) and/or hydrophobic (soft) components that may be interdispersed according to IPN (interpenetrating networks), although it is contemplated that the hydrophilic and hydrophobic components may be interdispersed in other ways. For another example, the polymer particles may be made of a hydrophobic core surrounded by a continuous or discontinuous hydrophilic shell. For another example, the polymer particle morphology may resemble a raspberry, in which a hydrophobic core is surrounded by several smaller hydrophilic particles that are attached to the core. For still another example, the polymer particles may include 2, 3, or 4 particles that are at least partially attached to one another.

The latex polymer particles may have a weight average molecular weight ranging from about 5,000 to about 500,000. As examples, the weight average molecular weight of the latex particles may range from about 100,000 to about 500,000, or from about 150,000 to about 300,000.

Latex particles may include a heteropolymer including a hydrophobic component that makes up from about 65% to about 99.9% (by weight) of the heteropolymer, and a hydrophilic component that makes up from about 0.1% to about 35% (by weight) of the heteropolymer, where the hydrophobic component may have a lower glass transition temperature than the hydrophilic component. In general, a lower content of the hydrophilic component is associated with easier use of the latex particles under typical ambient conditions. As used herein, typical ambient conditions include a temperature range from about 20° C. to about 25° C., an atmospheric pressure of about 100 kPa (kilopascals), and a relative humidity ranging from about 30% to about 90%. The glass transition temperature of the latex particles may range from about −20° C. to about 130° C., or in a specific example, from about 60° C. to about 105° C.

Examples of monomers that may be used to form the hydrophobic component include $C_1$ to $C_8$ alkyl acrylates or methacrylates, styrene, substituted methyl styrenes, polyol acrylates or methacrylates, vinyl monomers, vinyl esters, ethylene, maleate esters, fumarate esters, itaconate esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, tridecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), 1,3-butadiene, vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

The heteropolymer may be formed of at least two of the previously listed monomers, or at least one of the previously listed monomers and a higher $T_g$ hydrophilic monomer, such as an acidic monomer. Examples of acidic monomers that can be polymerized in forming the latex polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof. Other examples of high $T_g$ hydrophilic monomers include acrylamide, methacrylamide, monohydroxylated monomers, monoethoxylated monomers, polyhydroxylated monomers, or polyethoxylated monomers.

In examples, the aqueous dispersion of polymer particles (latexes) may be produced by emulsion polymerization or co-polymerization of any of the previously listed monomers. Other suitable techniques, specifically for generating a core-shell structure, may be used, such as: i) grafting a hydrophilic shell onto the surface of a hydrophobic core, ii) copolymerizing hydrophobic and hydrophilic monomers using ratios that lead to a more hydrophilic shell, iii) adding hydrophilic monomer (or excess hydrophilic monomer) toward the end of the copolymerization process so there is a higher concentration of hydrophilic monomer copolymerized at or near the surface, or iv) any other method known in the art to generate a more hydrophilic shell relative to the core.

In an example, the binder is present in the combined agent in an amount ranging from about 1 wt % to about 30 wt % based on a total weight of the combined agent. In another example, the binder is present in the combined agent in an amount ranging from about 2 wt % to about 25 wt % based on the total weight of combined agent. As shown in Table 3, these percentages may include both active binder and other non-active components present with the binder.

In examples of the combined agent, it is desirable that the total volume fraction of solids be about 50 vol. % or less, so that the combined agent is jettable via the desired inkjet printhead (e.g., thermal inkjet printhead, piezoelectric inkjet printhead, etc.). As such, the volume fraction of the gas precursor compound and the binder may be adjusted so that together, the components do not exceed, for example, from about 40 vol. % to about 50 vol. % of the total volume of the combined agent. The binding liquid functional agent may include the previously latex, any of a surfactant or a dispersing aid, a co-solvent, and a balance of water.

The co-solvent may be an organic co-solvent present in the liquid functional agent in an amount ranging from about 0.5 wt % to about 50 wt % (based on the total weight of the liquid functional agent). It is to be understood that other amounts outside of this range may also be used depending, at least in part, on the jetting architecture used to dispense the liquid functional agent. The organic co-solvent may be any water miscible, high-boiling point solvent, which has a boiling point of at least 120° C. Classes of organic co-solvents that may be used include aliphatic alcohols, aromatic alcohols, diols, glycol ethers, polyglycol ethers, 2-pyrrolidones/pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the liquid functional agent may include 2-pyrrolidone, 1,2-butanediol, 2-methyl-1,3-propanediol, 1-(2-hydroxyethyl)-2-pyrrolidone, or combinations thereof.

The liquid functional agent may also include a surfactant or a dispersing aid. Surfactant and dispersing aid may be used to improve the wetting properties and the jettability of the liquid functional agent. Examples of suitable surfactants and dispersing aids include those that are non-ionic, cationic, or anionic. Examples of suitable surfactants/wetting agents include a selfemulsifiable, non-ionic wetting agent based on acetylenic diol chemistry, such as SURFYNOL® SEF from Air Products and Chemicals, Inc., a non-ionic fluorosurfactant, such as CAPSTONE® fluorosurfactants from DuPont, previously known as ZONYL FSO, and combinations thereof. In one example, the surfactant is a non-ionic, ethoxylated acetylenic diol, such as SURFYNOL® 465 from Air Products and Chemical Inc. In other examples, the surfactant is an ethoxylated low-foam wetting agent, such as SURFYNOL® 440 or SURFYNOL® CT-111 from Air Products and Chemical Inc., or an ethoxylated wetting agent and molecular defoamer, such as SURFYNOL® 420 from Air Products and Chemical Inc. Still other suitable surfactants include non-ionic wetting agents and molecular defoamers, such as SURFYNOL® 104E from Air Products and Chemical Inc., or secondary alcohol ethoxylates, which are commercially available as TERGITOL® TMN-6, TERGITOL® 15-S-7, TERGITOL® 15-S-9, and the like, from The Dow Chemical Co. In some examples, it may be desirable to utilize a surfactant having a hydrophilic-lipophilic balance (HLB) less than 10. Examples of suitable dispersing aid(s) include those of the SILQUEST™ series from Momentive, including SILQUEST™ A-1230. Whether a single surfactant or dispersing aid is used or a combination of surfactants and/or dispersing aids is used, the total amount of surfactant and dispersing aid in the liquid functional agent may range from about 0.1 wt % to about 6 wt % based on the total weight of the liquid functional agent.

The liquid functional agent may also include antimicrobial agent(s). Suitable antimicrobial agents include biocides and fungicides. Example antimicrobial agents may include the NUOSEPT® (available from Ashland Inc.), UCARCIDE™ or KORDEK™ or ROCIMA™ (available from the Dow Chemical Co.), PROXEL® (available from Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT), and Bronopol (available from ThorChemicals), AXIDE™ (available from Planet Chemical), NIPACIDE™ (available from Clariant), blends of 5-chloro-2-methyl-4-isothiazolin- 3-one (CIT or CMIT) and MIT under the tradename KATHON™ (available from Dow Chemical Co.), and combinations thereof. In an example, the liquid functional agent may include a total amount of antimicrobial agents that ranges from about 0.01 wt % to about 1 wt %. In an example, the antimicrobial agent is a biocide and is present in the liquid functional agent in an amount of about 0.1 wt % (based on the total weight of the liquid functional agent). These percentages may include both active antimicrobial agent and other non-active components present with the antimicrobial agent.

An anti-kogation agent may also be included in the liquid functional agent. Kogation refers to the deposit of dried solids on a heating element of a thermal inkjet printhead. Anti-kogation agent are included to assist in preventing the buildup of kogation, and thus may be included when the liquid functional agent is to be dispensed using a thermal inkjet printhead. Examples of suitable anti-kogation agents include oleth-3-phosphate, commercially available as CRODAFOS™ O3A or CRODAFOS™ N-3 acid from Croda Int. or dextran 500 k. Other suitable examples of the anti-kogation agents include CRODAFOS™ HCE phosphate-ester (available from Croda Int.), CRODAFOS® N10 oleth-10-phosphate (available from Croda Int.), or DISPERSOGEN® LFH, a polymeric dispersing agent with aromatic anchoring groups in either an acid form or an anionic (available from Clariant), among others. The anti-kogation agent may be present in the liquid functional agent in an amount ranging from about 0.1 wt % to about 1 wt % of the total weight of the liquid functional agent.

Table 2, shows an example binding LFA formulation with no precursor (e.g., binding LFA 306), according to some examples. Again, in some examples, the active portion of the example binder is the combination of components Polyvinyl alcohol (low molecular wt), Selvol PVOH 107 and Polyvinyl pyrrolidone (low molecular wt. 15 k-19 k), BASF LUVITEC® K 17.

TABLE 2

Binding LFA formulation

| Components | Actives Weight % | Target Weight % | Formulation Weight % |
|---|---|---|---|
| Tergitol 15-S-7 | 90.00% | 1.47% | 1.63% |
| Polyvinyl alcohol (low molecular wt), Selvol PVOH 107 | 100.00% | 13.61% | 13.61% |
| Polyvinyl pyrrolidone (low molecular wt 15k-19k), BASF LUVITEC ® K 17 | 100.00% | 3.26% | 3.26% |
| ACTICIDE ® M20 (stock solution) | 10.00% | 0.01% | 0.10% |
| Water | | 81.65% | 81.40% |
| Total | | 100.00% | 100.00% |

The binding LFA may be used to pattern build material in forming the 3D object and breakaway region. The binding LFA may also be used in combination with examples of the liquid functional agent that do not include a binder to pattern build material when forming the support structure.

The binding LFA includes the binder. In an example, the binder is present in the binding agent in an amount ranging from about 1 wt % to about 30 wt % based on a total weight of the binding agent. In another example, the binder is present in the binding agent in an amount ranging from about 2 wt % to about 20 wt % based on the total weight of binding agent. These percentages may include active binder, and the percentages may be higher when other non-active components are considered.

In addition to the binder, the binding LFA may also include water, a cosolvent, a surfactant or a dispersing aid, an antimicrobial agent, or an anti-kogation agent. In these examples, any of the previously described co-solvents, surfactants or dispersing aids, antimicrobial agents, or anti-kogation agents may be used in any of the given amounts, except that the weight percentages are with respect to a total weight of the binding agent.

Breakaway Liquid Functional Agent (LFA)

To create the breakaway region, the precursor 604 that is dispensed from the breakaway LFA 506 combines with the powder 304 during sintering to form a breakaway compound. In some examples, the powder 304 is a type of stainless steel, and thus contains Iron (Fe), Nickel (Ni), and Chromium (Cr). The breakaway region thus is formed by combining the precursor with at least one of the elements contained in the powder.

Table 3 illustrates the breakaway compound formation made possible by the 3D binder jet printer of FIG. 1, according to some examples. As shown in Table 1, the powder 304 contains at least Iron (Fe) and Chromium (Cr), among other elements. In some examples, these react with materials in the breakaway LFA 506. Tables 4 and 5 indicate some possible components of the breakaway LFA 506, namely Carbon and Silicon. Possible breakaway compounds formed from the chemical reaction at the junction include Cementite ($Fe_3C$), Ferrosilicon (FeSi), and Chromium Carbide ($Cr_xC_y$).

TABLE 3

Breakaway compound components

| metal powder component | breakaway LFA component | breakaway compound |
|---|---|---|
| Iron (Fe) | Carbon (C) | $Fe_3C$ (cementite) |
| Iron (Fe) | Silicon (Si) | FeSi (ferrosilicon) |
| Chromium (Cr) | Carbon (C) | $Cr_xC_y$ (chromium carbide) |
| Chromium (Cr) | Silicon | $Cr_xSi_y$ |
| Titanium (Ti) | Carbon (C) | TiC |
| Titanium (Ti) | Silicon | $Ti_xSi_y$ |

As illustrated in FIGS. 3-11, two LFAs are used, in some examples, the binding LFA 306 and the breakaway LFA 506. This section lists the formulation contents and functions used, in some examples, for the LFAs. The section entitled "Breakaway Compound Chemistry" explains the creation of the breakaway material from the precursor 604.

The precursor compound may be present in the liquid functional agent in an amount ranging from about 1 wt % to about 75 wt % of the total weight of the liquid functional agent. In another example, the precursor compound may be present in the liquid functional agent in an amount ranging from about 2 wt % to about 40 wt % or about 50 wt % of the total weight of the liquid functional agent. These percentages may include both active precursor compound and other non-active components present with the compound. It is to be understood that the upper limit may be increased as long as the liquid functional agent can be jetted via a desired inkjet printhead.

In some examples, the balance of the liquid functional agent is water, such as deionized water. In these examples, the amount of water may vary depending upon the weight percent of the other liquid functional agent components. In other examples, the balance of the liquid functional agent is a solvent, such as any of the previously listed co-solvents.

Tables 4 and 5 show example breakaway LFA formulations (e.g., breakaway LFA 506), according to some examples. In each formulation, both an example binder and an example precursor are provided. In some examples, the active portion of the binder is the combination of components Polyvinyl alcohol (low molecular wt), Selvol PVOH 107 and Polyvinyl pyrrolidone (low molecular wt. 15 k-19 k), BASF LUVITEC® K 17. Examples of polyvinyl alcohol include low weight average molecular weight polyvinyl alcohols, such as from about 13,000 to about 50,000, such as SELVOL™ PVOH 17 from Sekisui. Examples of polyvinylpyrrolidones include low weight average molecular weight polyvinylpyrrolidones, for example, from about 15,000 to about 19,000, such as LUVITEC™ K 17 from BASF Corp.

Tergitol, Acticide®, and water are also present in the binder. Tergitol is commercially available as TERGITOL® TMN-6, TERGITOL® 15-S-7, or TERGITOL® 15-S-9, among others, from The Dow Chemical Co. Acticide® is commercially available as ACTICIDE® B20 and ACTICIDE® M20 and ACTICIDE® MBL, which are blends of 2-methyl-4-isothiazolin-3-one (MIT), 1,2-benzisothiazolin-3-one (BIT), and Bronopol (available from ThorChemicals), AXIDE™ (available from Planet Chemical), NIPACIDE™ (available from Clariant), blends of 5-chloro-2-methyl-4-isothiazolin-3-one (CIT or CMIT) and MIT under the tradename KATHON™ (available from the Dow Chemical Co.).

Soluble polymers contained in this binder formulation act as a glue for the powder and precursor particles. In other examples, the jettable binder is not limited to polyvinyl alcohol and polyvinyl pyrrolidone, but comprises any polymer binder rendered jettable in the form of solution or dispersion. At about 17% loading in the formulation, these components form a film adhering powder and precursor together with a strong enough mechanical bond to allow removal of the green part from the target zone and placement into the sintering oven. The binder components then substantially burn out during the burn-out phase of sintering. Example sintering operations for producing some breakaway compounds are described in detail.

The first breakaway LFA, shown in Table 4, contains a first example precursor, the Carbon Black, Cabot MONARCH® 1300, available from the Cabot Chemical Company. The MONARCH® 1300 has fine particle size distributions expressly designed to be suspended in and then deposited in an aqueous solution.

TABLE 4

First breakaway LFA formulation

| Components | Actives Weight % | Target Weight % | Formulation Weight % |
|---|---|---|---|
| Carbon Black, Cabot MONARCH ® 1300 | 100.00% | 13.04% | 13.04% |
| Tergitol 15-S-7 | 90.00% | 1.47% | 1.63% |
| Polyvinyl alcohol (low molecular wt), Selvol PVOH 107 | 100.00% | 13.61% | 13.61% |
| Polyvinyl pyrrolidone (low molecular wt 15k-19k), BASF LUVITEC ® K 17 | 100.00% | 3.26% | 3.26% |
| ACTICIDE ® M20 (stock solution) | 10.00% | 0.01% | 0.10% |
| Water | | 68.61% | 68.36% |
| Total | | 100.00% | 100.00% |

In some examples, as part of the breakaway LFA 506, the Carbon Black, Cabot MONARCH® 1300 is deposited interstitially in the openings between the particles making up the powder 304. Capillary flow moves the breakaway LFA from the surface where droplets are deposited through the powder between individual particles.

Other examples of the liquid functional agent are combined agents that may be used to pattern build material to form the build material support structure without using a separate binding agent. In these other examples, the liquid functional agent, or combined agent includes the binder, the precursor, water or a solvent, any co-solvent, any surfactant and any dispersing aid, and in some instances, may also include an antimicrobial agent and an anti-kogation agent. In these examples, any of the previously described precursors, co-solvents, surfactants or dispersing aids, antimicrobial agents, or anti-kogation agents may be used in any of the given amounts.

The second breakaway LFA, shown in Table 5, contains a second example precursor, the SkySpring Nanomaterials Product #: 9715DX, Silicon nanopowder/nanoparticles (Si, 99.9%, 500 nm). Like the MONARCH® 1300, the fine particle size of this product is small enough to stay suspended in and then deposited in an aqueous solution.

TABLE 5

Second breakaway LFA formulation

| Components | Actives Weight % | Target Weight % | Formulation Weight % |
|---|---|---|---|
| SkySpring Nanomaterials Product #: 9715DX Silicon nanopowder/nanoparticles (Si, 99.9%, 500 nm) | 100.00% | 13.04% | 13.04% |
| Tergitol 15-S-7 | 90.00% | 1.47% | 1.63% |
| Polyvinyl alcohol (low molecular wt), Selvol PVOH 107 | 100.00% | 13.61% | 13.61% |
| Polyvinyl pyrrolidone (low molecular wt 15k-19k), BASF LUVITEC ® K 17 | 100.00% | 3.26% | 3.26% |
| ACTICIDE ® M20 (stock solution) | 10.00% | 0.01% | 0.10% |
| Water | | 68.61% | 68.36% |
| Total | | 100.00% | 100.00% |

Breakaway Compound Chemistry

In some examples, the 3D binder jet printer of FIG. 1 creates a mechanically brittle junction for easy removal of a support (e.g., supporting structure 804 in FIG. 8) from the 3D object (e.g., 3D object 802 in FIG. 8) being generated. This brittle junction is formed of a breakaway material, such as an intermetallic compound or a metal carbide.

One definition of an intermetallic compound is a solid phase containing two or more metallic elements, optionally with one or more non-metallic elements that exists over a very narrow range of composition and whose crystal structures exhibit ordering of elemental constituents. The atomic bonding between intermetallic substances is of a mixed metallic and ionic character which results in physical properties that are usually different than that of solid solutions of elements whose composition is near that of the intermetallic phase. Homogeneous and heterogeneous solid solutions of metals, and interstitial compounds, such as the carbides and nitrides, are excluded under this definition. However, interstitial compounds that exhibit this mixed metallic ionic bonding between atoms are included in this definition, as are alloys of intermetallic compounds with a metal. Post-transition metals and metalloids (such as Silicon), and in some cases non-metals, such as Carbon, form suitable breakaway compounds. One such example is cementite, $Fe_3C$ (a carbide). In contrast, the metal carbide Titanium carbide (TiC) and Chromium carbides are not an intermetallic because bonding between atoms in these compounds is covalent.

In some examples, the breakaway compounds used by the 3D binder jet printer 100 include $Fe_3C$, FeSi, and $Cr_3C_2$ (as well as $Cr_7C_3$ and $Cr_{23}C_6$). Once formed in the junction between two solidly sintered metallic sections, such as between the part and the supporting part(s), these compounds produce the desired brittle region. In some examples, this brittle region enables easy removal of support structure(s). The examples herein illustrate the technique for generating the breakaway region. In practice, alloys may be a bit more complex. Nevertheless, the principles described herein may be applied to more complex alloys, such as one or more metal carbides, intermetallics, or both, when the binder with breakaway precursor is added to the powder.

$Fe_3C$ Breakaway Compound

In some examples, the operations of the 3D binder jet printer 100 of FIG. 1 generate the breakaway compound, cementite ($Fe_3C$), to create the desired brittle junction between the 3D part being printed and its supporting part(s). The cementite ($Fe_3C$) breakaway compound is formed when elemental Carbon mixes with Iron during sintering. In some examples, the composition of the breakaway compound is 6.67 wt % C and 93.33 wt % Fe. In regions where there is an excess of Carbon (composition is >6.67 wt % C), a two-phase mixture of $Fe_3C$ and C (graphite, and/or amorphous carbon) are formed. In regions where there is an excess of Fe (composition is >0.025 wt % C and <6.67 wt % C), a two-phase mixture of Ferrite (Fe) and Cementite ($Fe_3C$) are formed.

In the regions meant to become a breakaway junction, this Carbon is provided by the Cabot carbon black for the breakaway LFA formulation (Table 4). The Carbon Black particles are jetted in the LFA onto the target zone (e.g., FIG. 5), remain in the same approximate region through powder binding (e.g., FIGS. 6-8), removal of the 3D object and supporting structure from the target zone (e.g., FIG. 9), placement in the sintering oven (e.g., FIG. 10), and through binder removal phase (e.g., FIG. 11). The Carbon (from the precursor in the breakaway LFA) which is in contact with Iron (from the powder) begins to diffuse into the Iron and reacts to create $Fe_3C$, cementite. This chemical reaction, as well as the binder removal phase, takes place in the sintering oven, and is described in more detail herein.

FeSi Breakaway Compound

In some examples, the operations of the 3D binder jet printer 100 of FIG. 1 generate the breakaway compound, ferrosilicon (FeSi), to create the desired brittle junction between the 3D part being printed and its supporting structure(s). For forming regions of ferrosilicon (FeSi) in the sintering oven, in some examples, at least an atomic 50% of the breakaway material to be formed is available as elemental Silicon as the reaction takes place. In some examples, the Silicon is provided by the SkySpring Silicon nanopowder for the second breakaway LFA formulation (Table 5). The Silicon particles are jetted in the LFA onto the target zone (e.g., FIG. 5), remain in the same approximate region through powder binding (e.g., FIGS. 6-8), removal of the 3D object and support structure (e.g., FIG. 9), placement in the sintering oven (e.g., FIG. 10) and through the burnout phase (e.g., FIG. 11). When the oven is heated, the Iron and Silicon inter-diffuse and the FeSi breakaway compound is formed.

$Cr_xC_y$ Breakaway Compound

In some examples, the operations of the 3D binder jet printer 100 of FIG. 1 generate the breakaway compound, Chromium Carbide ($Cr_3C_2$, $Cr_7C_3$, and $Cr_{23}C_6$), to create the desired brittle junction between the 3D part being printed and its supporting structure(s). An additional set of chemistries can be favored to occur between Carbon and Chromium during oven processing.

Table 6 shows a temperature program, according to some examples, used to sinter the stainless steel part generated by the 3D binder jet printer 100 of FIG. 1. In some examples, the temperature program of Table 6 is used for generating Chromium Carbide ($Cr_3C_2$, $Cr_7C_3$, and $Cr_{23}C_6$).

TABLE 6

Furnace program for 316L green part sintering and CrxCy formation.

| Sequence | Temp, ° C. | Ramp Rate/Hold | Function |
|---|---|---|---|
| 1 | RT-238 | 5° C./min | |
| 2 | 238-450 | 0.5° C./min | |
| 3 | 450 | Hold 180 min | burn out |
| 4 | 450-700 | 2.5° C./min | |
| 5 | 700 | Hold 180 min | $Cr_xC_y$ formation |
| 6 | 700-1350 | 2.5° C./min | |
| 7 | 1350 | Hold 240 min | sinter |
| 8 | 1350-RT | 5° C./min | |

Figure 12:
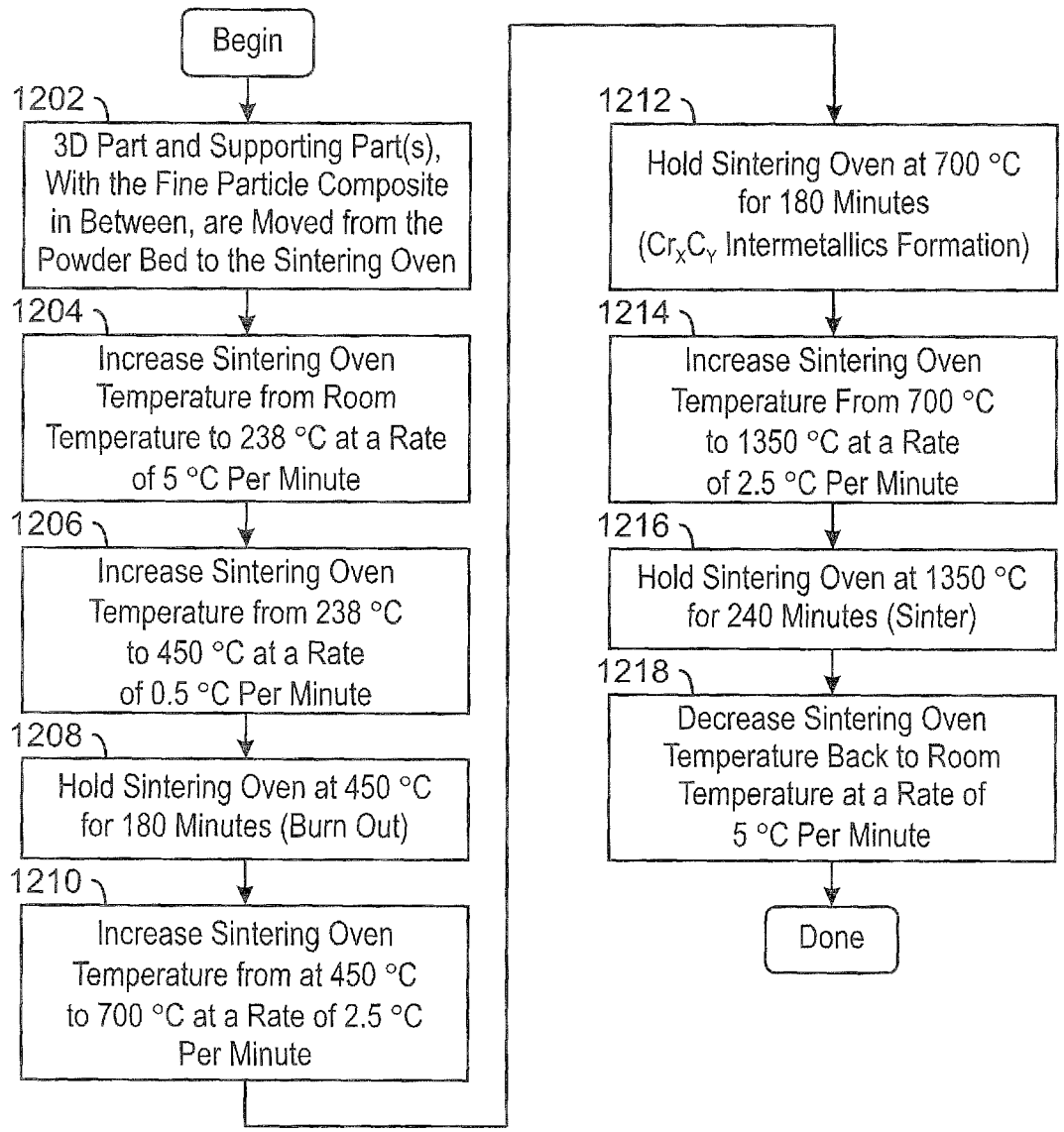
FIG. 12 is a flow diagram of the sintering oven operations for creating a $Cr_xC_y$ breakaway region in the junction between part and supporting part(s), according to some examples.

In conjunction with Table 6, FIG. 12 illustrates the temperature program for formation of Chromium Carbide in the fine particle composite 602 that is to form the junction. Initially, the 3D part (e.g., part 802, FIG. 8), the supporting part(s), and the fine particle composite disposed between the part and supporting part(s) (e.g., 802, 804, and 602, FIG. 8) are moved from the target zone to the sintering oven (block 1202). The temperature of the sintering oven is increased, at 5° C. per minute, from room temperature to 238° C. (block 1204). The temperature is then increased from 238° C. to 450° C., at 0.5° C. per minute (block 1206).

To convert the green part into a sintered part, the binder material is removed. Heating the green part to between 300° C. and 500° C. causes thermal decomposition of the binder material. During binder removal (also called "burn out"), the sintering oven is set to 450° C. and held for three hours (block 1208). At this point, the binder agents, from both the binding LFA (e.g., binding LFA 306, FIG. 3) and the breakaway LFA (e.g., breakaway LFA 506, FIG. 5) either vaporize or become otherwise removed. In some examples, components of binder formulation decompose thermally at between 300° C. and 500° C.

Following burn out, the sintering oven is heated further, from 450° C. to 700° C., at a rate of 2.5° C. per minute (block 1210), then the temperature is held at 700° C. for three hours (block 1212). In some examples, the $Cr_xC_y$ formation happens here. Next, the temperature is increased, at 2.5° C. per minute, from 700° C. to 1350° C. (block 1214). This is the sintering operation, in which the temperature is maintained at 1350° C. for four hours (block 1216). Once the sintering is complete, the temperature of the sintering oven is reduced, at a rate of 5° C. per minute, from 1350° C. to room temperature (block 1218) and the sintering phase is complete.

For the Carbon precursor delivered in the breakaway LFA (see the breakaway LFA formulation in Table 4), in some examples, a local (atomic %) concentration of between 20 and 40%, will favor formation of high concentrations of $Cr_{23}C_6$, $Cr_7C_3$, and $Cr_3C_2$ and mixtures of these carbides. Even at lower concentrations of carbon (down to ~0.3%), Chromium carbide compounds forming in low concentrations will still have an embrittling effect on the part being fabricated, in some examples. Typically, a range of concentrations may be used. With this (atomic %) range concentration of Carbon disposed adjacent to Chromium in the junction, a brittle breakaway compound formed during Table 6 oven program stage 5, in some examples.

Sintering Oven

Table 7 shows a temperature program, according to some examples, used to sinter the stainless-steel part generated by the 3D binder jet printer 100 of FIG. 1. In some examples, the temperature program of Table 7 is used for generating Cementite ($Fe_3C$) and Ferrosilicon (FeSi).

Figure 13:
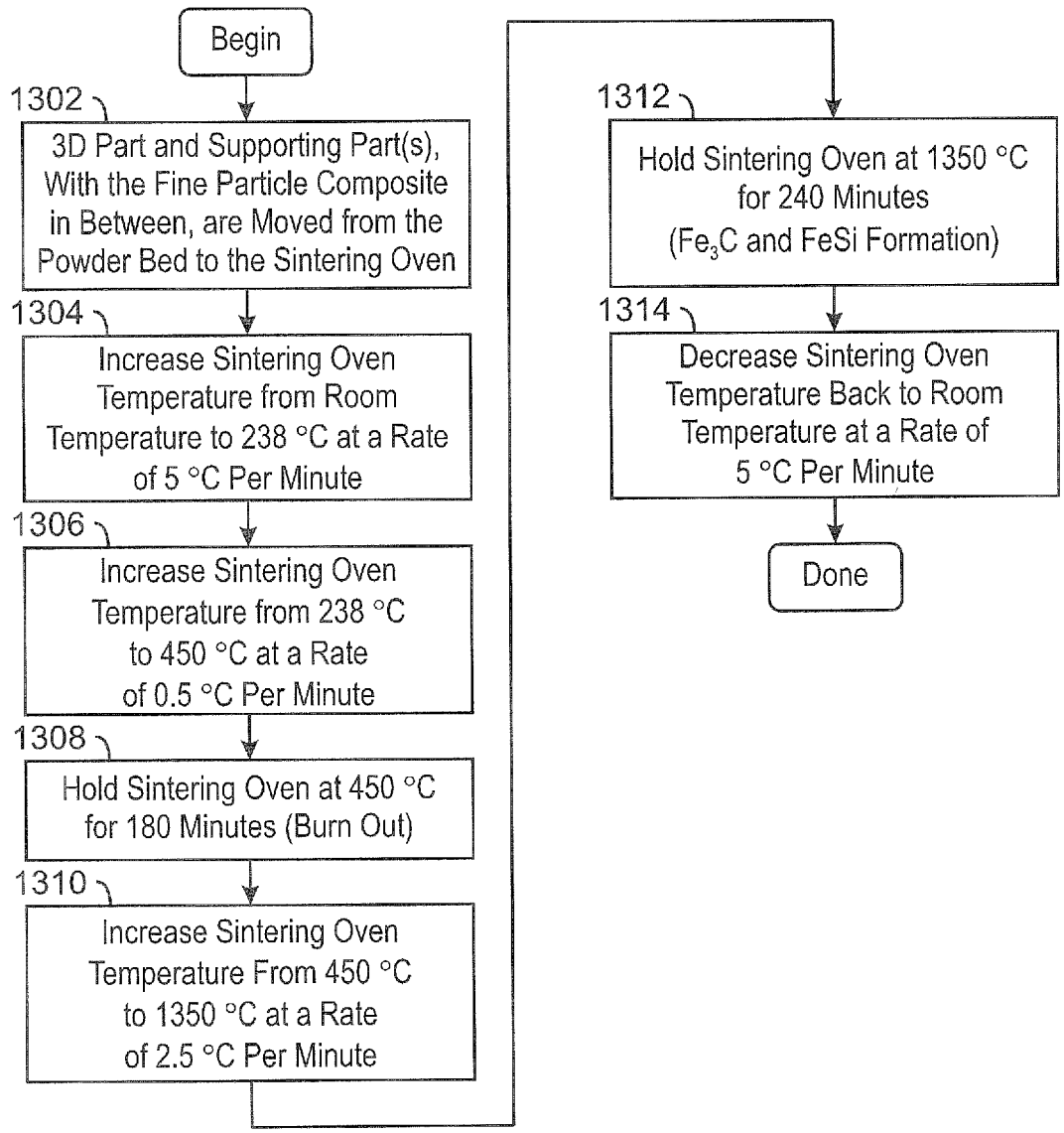
FIG. 13 is a flow diagram of the sintering oven operations for creating a $Fe_3C$ or FeSi breakaway region in the junction between part and supporting part(s), according to some examples.

In conjunction with Table 7, FIG. 13 illustrates the temperature program for formation of Cementite or Ferrosilicon in the fine particle composite 602 that is to form the junction. Initially, the 3D part (e.g., 3D object 802, FIG. 8), the supporting structure(s), and the fine particle composite disposed therebetween (e.g., 802, 804, and 602, FIG. 8) are moved from the target zone to the sintering oven (block 1302). The temperature of the sintering oven is increased, at 5° C. per minute, from room temperature to 238° C. (block 1304). The temperature is then increased from 238° C. to 450° C., at 0.5° C. per minute (block 1306). During binder removal (also called "burn out"), the sintering oven is set to 450° C. and held for three hours (block 1308). In some examples, the sintering over is set to a value between 300° C. and 500° C. At this point, the binder agents, from both the binding LFA (e.g., binding LFA 306, FIG. 3) and the breakaway LFA (e.g., breakaway LFA 506, FIG. 5) either vaporize or become otherwise removed.

Following burn out, the sintering oven is heated further, from 450° C. to 1350° C., at a rate of 2.5° C. per minute (block 1310), then the temperature is held at 1350° C. for four hours (block 1312). In some examples, the temperature during this operation is based on the sintering temperature of the stainless steel 316L alloy (1350° C.) from Table 1. Once sintering is complete, the temperature of the sintering oven is reduced, at a rate of 5° C. per minute, from 1350° C. to room temperature (block 1314).

TABLE 7

Furnace program for 316L green part sintering

| Sequence | Temp, ° C. | Ramp Rate/Hold | Function |
|---|---|---|---|
| 1 | RT-238 | 5° C./min | |
| 2 | 238-450 | 0.5° C./min | |
| 3 | 450 | Hold 180 min | burn out |
| 4 | 450-1350 | 2.5° C./min | |
| 5 | 1350 | Hold 240 min | sinter |
| 6 | 1350-RT | 5° C./min | |

In some examples, the oven sintering temperature is 1350° C. At this temperature, the 316L metal is near its Melting Range of 1371-1399° C. In some examples, the precursor element and the metal in the powder will be partially liquid and in close contact at this temperature. Once the reaction to form the breakaway compound is thermodynamically favored, the breakaway compound is formed.

Where the 430L stainless steel is instead used, its melting point is higher, 1425° C.-1510° C. versus 1375° C.-1400° C. for 316L stainless steel. Thus, the sintering temperature is higher when using 430L material.

In addition to the temperature program described in Table 7, consideration is also made of the gas composition of the sintering oven, in some examples. For Carbon as a precursor, there is one recipe, and for Silicon as a precursor, there is a second recipe, as described herein.

Carbon as a Precursor

A first gas recipe is for Carbon as a precursor, in some examples. For Carbon as a precursor, green body sintering occurs in a reducing atmosphere, such as 5-20% Carbon Monoxide (CO) atmosphere with a balance of Argon. In some examples, hydrogen ($H_2$) is not used, as hydrogen would react with the Carbon and remove a portion of Carbon precursor as Methane ($CH_4$) in the exhaust gas. In some examples, gas flow of the reducing atmosphere is at a rate of approximately 40 cc/min at room temperature and atmospheric pressure. The flow rate for either Carbon as a precursor or Silicon as a precursor is highly dependent on the geometry, loading, and ramp rate of the sintering furnace. The flow rate presented herein is an example for illustration. In some examples, the sintering may be performed in an inert sintering gas environment, such as argon gas, or in a vacuum chamber.

Silicon as a Precursor

A second gas recipe is for Silicon as a precursor, in some examples. For Silicon as a precursor, green body sintering occurs in a vacuum or Ar atmosphere to prevent formation of Silicon Dioxide ($SiO_2$). After reacting early in the furnace program into thermodynamically stable $SiO_2$, the Silicon would not be available at the higher sintering temperatures. Hence, potentially reactive gasses such as Carbon Monoxide (CO) are not used, in some examples. Hydrogen ($H_2$) is also not used, in some examples, as Hydrogen may react with the Silicon and remove a portion of the precursor as Silicon Hydride ($SiH_4$), with that portion leaving the oven entirely in the exhaust gas flow.

Breakaway Junction Formation

In some examples, the formation of the breakaway junction happens as a result of the precursor in the breakaway LFA forming a structurally brittle breakaway compound with a metal in the green part during the oven program, usually in the sintering phase. In the examples given thus far, the breakaway compound is formed with Iron or Chromium as the metal in the green part, using either Carbon or Silicon added to the breakaway LFA. In additional examples, a Titanium alloy may be used in place of the stainless steel, while Carbon or Silicon are used to form TiC and $Ti_xSi_y$ compounds in the breakaway junction.

Figure 14:
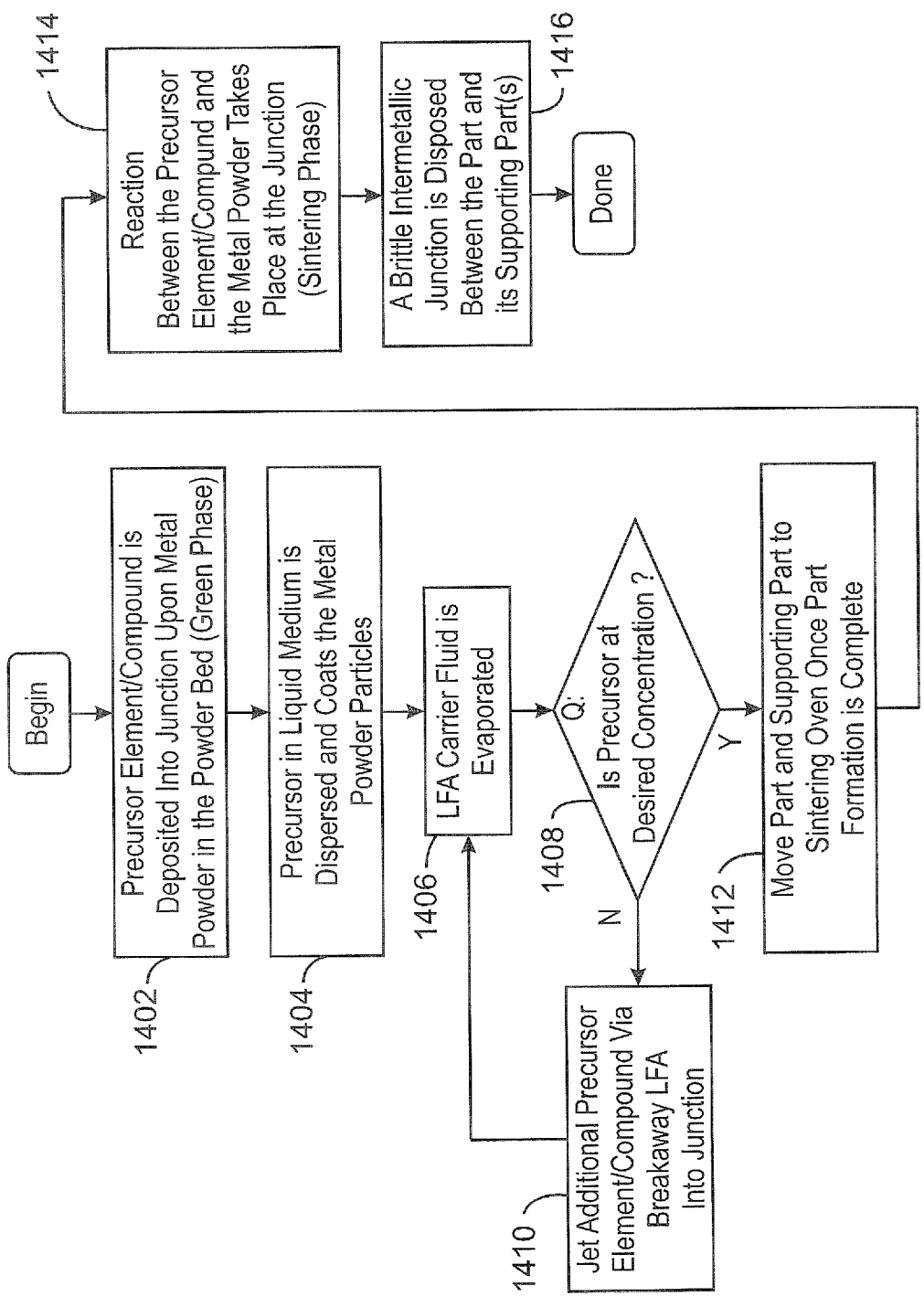
FIG. 14 is a flow diagram of a method for creating a breakaway junction in a 3D part, according to some examples.

FIG. 14 is a flow diagram showing a method 1400 of forming a breakaway junction made possible by the 3D binder jet printer of FIG. 1, according to some examples. The method 1400 operations are not exhaustive, for example, binder burnout is not mentioned. FIGS. 3-11 supply a more complete illustration of the green part generation phase, and Tables 6 and 7, along with FIGS. 12 and 13, indicate detailed sintering phase operations in two examples.

Initially, as described herein, during formation of the 3D part and supporting part(s), a deposition of the desired precursor element or compound is made. This deposition is made strategically, as illustrated in FIG. 5, such that powder already deposited at the junction are covered with the breakaway LFA (block 1402), such as the breakaway LFA 506 (Tables 4 and 5) that is jetted upon the powder (green part generation phase). The precursor suspended in the aqueous solution making up the breakaway LFA is dispersed along the row of powder and coats the powder (block 1404). The number of rows making up the junction may vary.

For example, in the breakaway LFA described in Table 4, the Carbon Black, Cabot MONARCH® 1300 would be deposited interstitially in the openings between the particles of the powder. Capillary flow moves the breakaway LFA from surface where droplets are deposited through the powder between individual particles.

Alternatively, the LFA carrier fluid is evaporated (block 1406) and further deposited (block 1410) until a desired concentration of fine particle composite (see FIG. 6) is obtained (block 1408). Evaporation of the binder liquid phase volatile components, such as water, solvents, and so on, takes place, leaving behind the binder material, which binds to the powder forming the green part. Additional layers of powder may be deposited over the fine particle composite, until the 3D part and supporting structure(s) are complete.

For example, the breakaway LFA formulations of Tables 4 and 5 both contain about 69% water. This water is removed by evaporation before the green part is removed from the target zone. After the water evaporates, the binder and the micro particles remain. During evaporation, the precursor element or compound collects across the surface of the particles.

The 3D object and supporting structure(s) making up the green part are then moved from the target zone (green part generation phase) to a sintering oven (sintering phase) (block 1412). During the sintering phase, the binder is removed (e.g., operation in Table 7, denoted, "burn out"). Next, the particles are to be sintered together (e.g., operation in Table 7, denoted "sinter"). A reaction between the metal in the metal powder (such as Fe, Cr, or Ti) and the metal in the precursor (such as Si, C, or Ti) takes place (block 1414), where the metal particles soften and merge together. A mechanically brittle break results in the junction between the 3D object and the supporting structure(s) (block 1416), enabling facile separation of the 3D object from its supporting structure(s) following removal from the sintering oven. In some examples, the breakaway junction has a reduced force portion between the 3D object and its supporting structure(s).

Thus, the method 1400 is designed to create fragility into the contiguous structure comprising the 3D object and its supporting structure(s). The method achieves this fragility during sintering by the formation of a breakaway compound using a metal from the powder combined with a metallic, metalloid or Carbon in the breakaway LFA, with the metals reacting to create a breakaway compound at sintering temperatures.

In some examples, a higher melting point of the breakaway compound, relative to the metal in the powder (Table 1), assures that the part's metal alloy is unchanged in the areas of the 3D object adjacent to the breakaway region. Thus, in FIG. 9, the powder 304 located in rows 4 and 6, which are disposed below and above the fine particle composite 602, do not deform or otherwise react during the sintering phase, in some examples.

In practice, it is difficult to have a digital on/off type of interface between the part and the support structure. In some examples, any encroachment of the breakaway compound, whether an intermetallic or a metal carbide, into the part is minimized by selecting breakaway materials that have a higher melting/decomposition point than the sintering temperature. One strategy to mitigate any encroachment of the breakaway compound into the part would be to offset the composite layer into the support such that any encroachment of the breakaway compound layer does not go beyond the interface between the support structure and the part under construction.

The 3D binder jet printer 100 and method of generating the breakaway junction 1400 may include the easy removal of supporting structure(s) following the sintering phase and the ability to separate the 3D object from the supporting structure(s) without use of cutting tools. In other words, the breakaway junction allows the supporting structure(s) to be reasonably removed from the 3D object. In some examples, reasonably removed means that an ordinary person will be able to remove the binder jet printed part away from the supporting structure(s) using hands or simple tools. In ordinary cases, the use of cutting tools may be avoided entirely. There may be unusual cases, where a support structure is trapped within the 3D object in some fashion, such that metal cutting may be used. Even then, the metal cutting may allow loose sections of support to be pried out, while cutting between the 3D object and the supporting structure(s) is able to be avoided.

Further, with the apparatus 100 and method 1400, the 3D object being formed is not compromised adjacent to the breakaway region, as the metal alloy remains unchanged despite the reaction taking place in the region of the fine particle composite.

As an alternative to using the breakaway LFAs described herein, in some examples, a material in a Fused Deposition Modelling (FDM) filament may be used to deposit the precursor in the breakaway junction.

FIG. 15 is a simplified illustration of an additive manufacturing system 1500, according to examples. The system 1500 may be operated to generate a tangible three-dimensional part, such as the 3D part comprising a 3D object, a supporting structure, and an interface described herein, by causing the selective solidification of portions of successive layers of a build material.

In one example, the build material is a powder-based build material. As used herein the term powder-based materials is intended to encompass both dry and wet powder-based materials, particulate materials, and granular materials. It should be understood, however, that the examples described herein are not limited to powder-based materials, and may be used, with suitable modification if appropriate, with other suitable build materials. In other examples the build material may be a paste or a gel, or any other suitable form of build material, for instance.

The system 1500 comprises a system controller 1502 that controls the general operation of the additive manufacturing system 1500. In the example shown in FIG. 15, the controller 1502 is a microprocessor-based controller that is coupled to a memory 1504, for example, via a communications bus (not shown). The memory stores processor executable instructions 1506. The controller 1502 may execute the instructions 1506 and hence control operation of the system 1500 in accordance with those instructions.

The system 1500 further comprises a coalescing agent distributor 1508 to selectively deliver or deposit coalescing agent, such as the binding LFA 306 described herein, to a layer of build material provided on a support member 1514. The system 1500 also comprises a coalescence modifier agent distributor 1510 to selectively deliver coalescence modifier agent, such as the interface agent 506 described herein, to a layer of build material provided on a support member 1514.

The controller 1502 controls a delivery mechanism to perform the selective delivery or selective deposition of coalescing agent and coalescence modifier agent to a layer of provided build material in accordance with agent delivery control data 1516. In the example of FIG. 15, the agent distributors 1508 and 1510 are print heads, such as thermal print heads or piezo inkjet print heads. In one example, print heads such as suitable print heads commonly used in commercially available inkjet printers may be used. The print heads 1508 and 1510 may be used to selectively deliver coalescing agent and coalescence modifier agent when in the form of suitable fluids. The print heads may be selected to deliver drops of agent at any of a variety of resolutions.

In some examples, the agent distributors 1508 and 1510 may be an integral part of the system 1500. In some examples, the agent distributors 1508 and 1510 may be user replaceable, in which case they may be removably insertable into a suitable agent distributor receiver or interface module (not shown). In some examples, a single inkjet print head may be used to selectively deliver both coalescing agent and coalescence modifier agent.

The agent distributors 1508 and 1510 are mounted on a moveable carriage (not shown) to enable them to move bi-directionally across the length of the support 1514 along the illustrated y-axis. This enables selective delivery of coalescing agent and coalescence modifier agent across the whole width and length of the support 1514 in a single pass. In other examples, the agent distributors 1508 and 1510 may be fixed, and the support member 1514 may move relative to the agent distributors 1508 and 1510.

It should be noted that the term "width" used herein is used to generally denote the shortest dimension in the plane parallel to the x and y axes illustrated in FIG. 15, whilst the term "length" used herein is used to generally denote the longest dimension in this plane. However, it will be understood that in other examples the term "width" may be interchangeable with the term "length." For example, in other examples the agent distributors may have a length that enables them to span the whole length of the support member 1514 whilst the moveable carriage may move bi-directionally across the width of the support 1514.

In another example, the agent distributors 1508 and 1510 do not have a length that enables them to span the whole width of the support member but are additionally movable bi-directionally across the width of the support 1514 in the illustrated x-axis. This configuration enables selective delivery of coalescing agent and coalescence modifier agent across the whole width and length of the support 1514 using multiple passes. Other configurations, however, such as a page-wide array configuration, may enable three-dimensional objects to be created faster.

The system 1500 further comprises a build material distributor 1518 to provide the layer of build material, such as the powder 106 of FIG. 1, on the support 1514. Suitable build material distributors may include, for example, a wiper blade and a roller. Build material may be supplied to the build material distributor 1518 from a hopper or build material store (not shown). In the example shown, the build material distributor 1518 moves across the length (y-axis) of the support 1514 to deposit a layer of build material. As previously described, a first layer of build material will be deposited on the support 1514, whereas subsequent layers of build material will be deposited on a previously deposited layer of build material.

In the example shown, the support 1514 is moveable in the z-axis such that as new layers of build material are deposited a predetermined gap is maintained between the surface of the most recently deposited layer of build material and lower surface of the agent distributors 1508 and 1510. In other examples, however, the support 1514 may not be movable in the z-axis and the agent distributors 1508 and 1510 may be movable in the z-axis.

The system 1500 additionally comprises an energy source 1520 to apply energy to build material to cause the solidification of portions of the build material according to where coalescing agent has been delivered or has penetrated. In one example, the energy source 1520 is an infra-red (IR) or near IR light source. In one example, the energy source 1520 may be a single energy source that is able to uniformly apply energy to build material or an array of energy sources.

In one example, the energy source 1520 may be mounted on a moveable carriage. In other examples, the energy source may apply a variable amount of energy as it is moved across the layer of build material, for example in accordance with agent delivery control data. For example, the controller 1502 may control the energy source only to apply energy to portions of build material on which coalescing agent has been applied.

In some examples, the support 1514 may not be a fixed part of the system 1500, but may, for example, be part of a removable module. In some examples both the support 1514 and the build material distributor may not be a fixed part of the system 1500, but may, for example, be part of a removable module. In other examples, other elements of the system 1500 may be part of a removable module.

Figure 16:
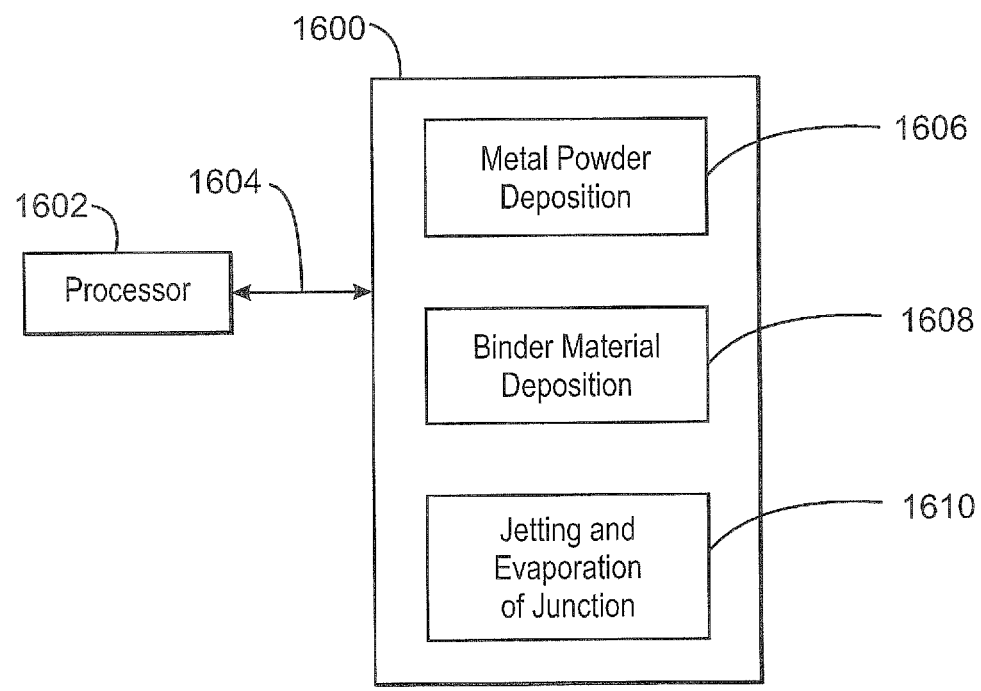
FIG. 16 is a block diagram of a non-transitory, machine-readable medium attached to a control mechanism for generating the 3D metal part with a breakaway junction, in accordance with examples.

FIG. 16 is a block diagram of a non-transitory, machine-readable medium 1600 attached to a jetting device of a 3D printer, such as the 3D binder jet printer of FIG. 1, in accordance with examples. Like numbered items are as described with respect to previous figures. The non-transitory, machine readable medium may be the control mechanism 112 (FIG. 1). A processor 1602, for example, in a control system of a printer, may access the non-transitory, machine readable medium over a reader mechanism, as indicated by arrow 1604.

The non-transitory, machine readable medium 1600 may include code 1606, 1608, and 1610, to direct the processor 1602 to implement operations for generating the 3D object. Powder deposition 1606, for example, controls the amount of powder dispensed onto the substrate in the target zone, as described herein. In some examples, the powder 106 is dispersed across the build platform 104 by a powder spreader. Binder material deposition 1608 controls which powder is to receive binding LFA or breakaway LFA, as described herein, to coat the powder and, in the case of breakaway LFA deposition, cause the formation of a breakaway compound, in the junction. Jetting and evaporation of the junction 1610, alternatively jets breakaway LFA (including the precursor) and evaporates the powder coated with the precursor, until a desired concentration of breakaway compound in the junction is obtained.

Other parameters and procedures may also be stored on the non-transitory, machine readable medium 1600. For example, the non-transitory, machine readable medium 1600 may include a material type for a build material in the target zone. Code may be stored on the non-transitory, machine readable medium 1600 to direct the processor 1602 to respond to a mismatch between the material type and an expected material type. These procedures may be instead of or in addition to procedures stored by a controller on the 3D printer.

While the foregoing examples are illustrative of the principles of one or more particular applications, it will be apparent to those of ordinary skill in the art that numerous modifications in form, usage, and details of implementation can be made without the exercise of inventive faculty, and without departing from the principles and concepts described herein. It is intended that the appended claims cover all such modifications and variations as fall within the true spirit and scope of the disclosure.

We claim:

1. An apparatus comprising:
   a build material store containing metal powder;
   a powder formation mechanism to receive the metal powder from the build material store and to enable a layer of the metal powder to be formed along a target zone;
   a first agent distributor containing a liquid functional agent (LFA), the first agent distributor to deposit the LFA upon the layer of powder;
   a second agent distributor containing an interface LFA, the interface LFA including a binding agent and a precursor that is to form a metal carbide, an intermetallic, or both when interacted with the metal powder, and the second agent distributor to deposit the interface LFA upon the layer of powder; and
   a controller to selectively activate the powder formation mechanism and the delivery mechanism based on an object model of a three-dimensional (3D) part comprising a 3D object, a support structure, and an interface.

2. The apparatus of claim 1, wherein the precursor is selected from a group consisting of ferrosilicon, chromium carbide, and cementite.

3. The apparatus of claim 1, wherein:
   the precursor is elemental carbon;
   the metal powder includes iron; and
   the metal carbide that is to be formed is cementite.

4. The apparatus of claim 1, wherein:
   the precursor is elemental silicon;
   the metal powder includes iron; and
   the intermetallic that is to be formed is ferrosilicon.

5. The apparatus of claim 1, wherein:
   the precursor is elemental carbon;
   the metal powder includes chromium; and
   the metal carbide that is to be formed is a chromium carbide.

6. The apparatus of claim 1, wherein:
   the precursor is elemental silicon;
   the metal powder includes chromium; and
   the intermetallic that is to be formed is a chromium silicide.

7. The apparatus of claim 1, wherein:
   the precursor is elemental carbon;
   the metal powder includes titanium; and
   the metal carbide that is to be formed is titanium carbide.

8. The apparatus of claim 1, wherein:
   the precursor is elemental silicon;
   the metal powder includes titanium; and
   the intermetallic that is to be formed is a titanium silicide.

* * * * *